United States Patent
Stockdale et al.

(10) Patent No.: US 11,418,523 B2
(45) Date of Patent: Aug. 16, 2022

(54) ARTIFICIAL INTELLIGENCE PRIVACY PROTECTION FOR CYBERSECURITY ANALYSIS

(71) Applicant: Darktrace Limited, Cambridge (GB)

(72) Inventors: Jack Stockdale, Cambridge (GB); Maximilian Heinemeyer, Lower Saxony (DE)

(73) Assignee: Darktrace Holdings Limited, Cambridge (GB)

( * ) Notice: Subject to any disclaimer, the term of this patent is extended or adjusted under 35 U.S.C. 154(b) by 781 days.

(21) Appl. No.: 16/279,013

(22) Filed: Feb. 19, 2019

(65) Prior Publication Data

US 2019/0260784 A1 Aug. 22, 2019

Related U.S. Application Data

(60) Provisional application No. 62/632,623, filed on Feb. 20, 2018.

(51) Int. Cl.
*H04L 9/40* (2022.01)
*G06F 3/04842* (2022.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
CPC . G06N 20/10; H04L 63/1425; G06F 21/6245; G06F 21/84; G06F 2221/032; G06F 21/60; G06F 21/62; H04W 12/02
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Wei et al., "Machine Learning-Based Malicious Application Detection of Android," IEEE Access Year: 2017 | vol. 5 | Journal Article | Publisher: IEEE.*
(Continued)

*Primary Examiner* — Roderick Tolentino
(74) *Attorney, Agent, or Firm* — Rutan & Tucker, LLP

(57) ABSTRACT

A privacy protection component can automatically comply with a set of privacy requirements when displaying input data. An ingestion module collects input data describing network activity executed by a network entity. A clustering module identifies data fields with data values within the input data as data identifiable to the network entity using machine-learning models trained on known data fields and their data. The clustering module also clusters the data values with other data values having similar characteristics using machine-learning models to infer a privacy level associated with each data field. The privacy level is utilized to indicate whether a data value in that data field should be anonymized. A permission module determines a privacy status of that data field by comparing the privacy level from the clustering module to a permission threshold. An aliasing module applies an alias transform to the data value of that data field with a privacy alias to anonymize that data value in that data field. A user interface module displays the input data to a system user with the privacy alias from the aliasing module substituted for the data value for that data field.

19 Claims, 16 Drawing Sheets

(51) Int. Cl.

| | | |
|---|---|---|
| *G06N 20/10* | (2019.01) | |
| *G06N 20/00* | (2019.01) | |
| *G06N 20/20* | (2019.01) | |
| *H04L 51/42* | (2022.01) | |
| *G06F 21/36* | (2013.01) | |
| *H04L 43/045* | (2022.01) | |
| *G06F 16/2455* | (2019.01) | |
| *G06F 3/0486* | (2013.01) | |
| *H04L 41/22* | (2022.01) | |
| *G06K 9/62* | (2022.01) | |
| *G06F 21/55* | (2013.01) | |
| *H04L 51/00* | (2022.01) | |
| *G06F 40/40* | (2020.01) | |
| *G06V 30/10* | (2022.01) | |

(52) U.S. Cl.
CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06N 20/20* (2019.01); *G06V 30/10* (2022.01); *H04L 41/22* (2013.01); *H04L 43/045* (2013.01); *H04L 51/12* (2013.01); *H04L 51/22* (2013.01); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/1483* (2013.01); *H04L 63/20* (2013.01)

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 8,312,540 B1 | 11/2012 | Kahn et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmuel et al. |
| 9,727,723 B1 | 8/2017 | Kondaveeti et al. |
| 10,049,222 B1* | 8/2018 | Allen .................. G06F 21/62 |
| 11,132,660 B2* | 9/2021 | Sidhu .................. G06Q 20/06 |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2005/0251865 A1* | 11/2005 | Mont .................. G06F 21/6245 726/26 |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0112429 A1* | 4/2016 | Sundaresan ............ H04L 63/08 726/4 |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0352768 A1 | 12/2016 | Lefebvre et al. |
| 2016/0373476 A1 | 12/2016 | Dell'Anno et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0082068 A1* | 3/2018 | Lancioni ................ G06F 21/84 |
| 2018/0096260 A1* | 4/2018 | Zimmer ................ G06N 5/04 |
| 2018/0107839 A1* | 4/2018 | Clement ................ G06F 3/017 |
| 2018/0137263 A1* | 5/2018 | Kurian ................ B60N 2/002 |
| 2018/0167402 A1 | 6/2018 | Scheidler et al. |
| 2018/0189629 A1* | 7/2018 | Yatziv ................ G06F 21/60 |
| 2018/0351961 A1* | 12/2018 | Calcaterra ............ H04L 63/105 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Zhang et al., "Misbehavior Detection Based on Support Vector Machine and Dempster-Shafer Theory of Evidence in VANETs," IEEE Access Year: 2018 | vol. 6 | Journal Article | Publisher: IEEE.*
Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

(56) References Cited

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

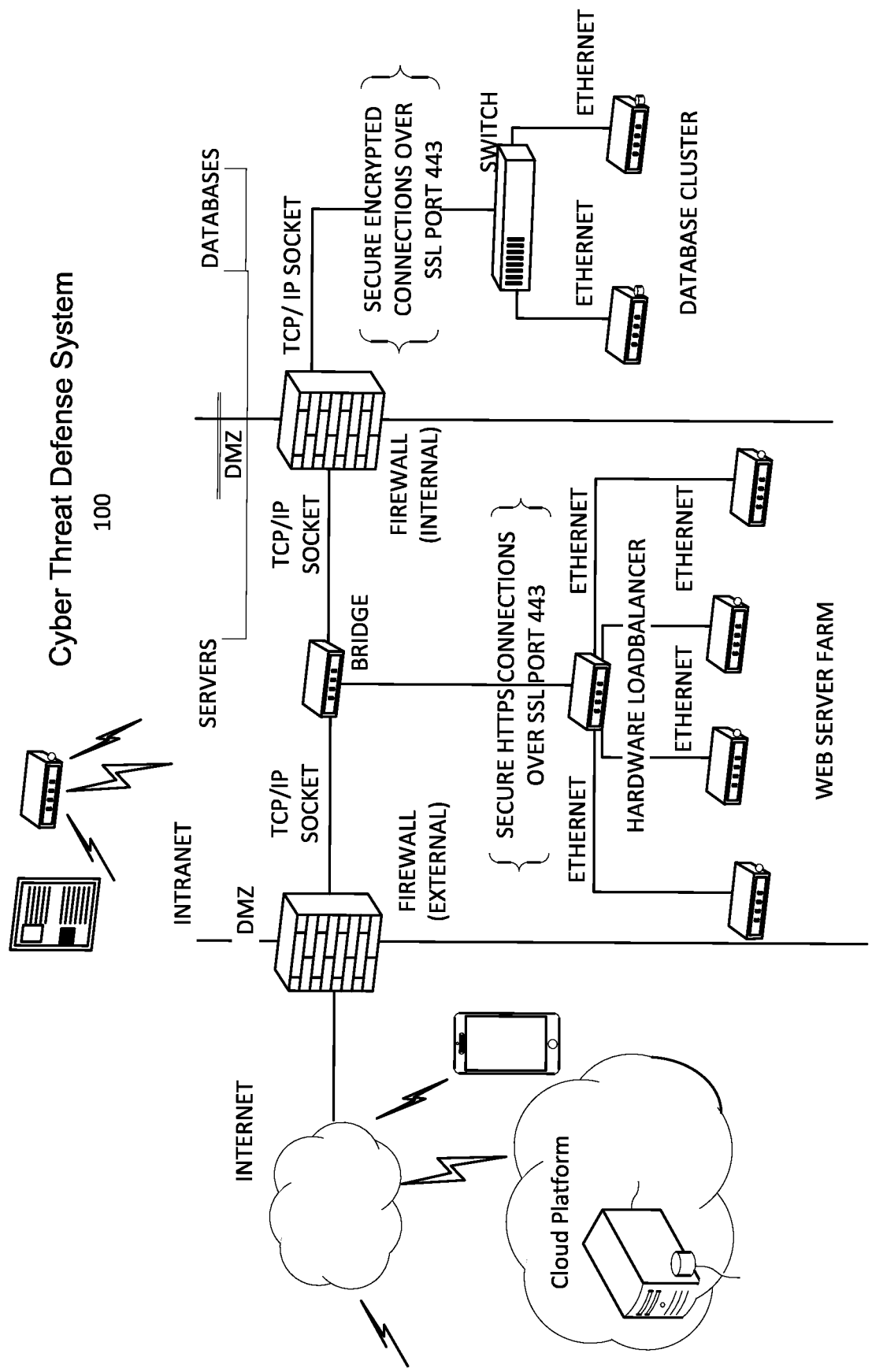
FIG. 16 Network

ARTIFICIAL INTELLIGENCE PRIVACY PROTECTION FOR CYBERSECURITY ANALYSIS

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, a cyber threat defense system may automatically replace personally identifiable information with an alias.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

A Cyber threat, including email threats, viruses, Trojan horses, and worms, can subtly and rapidly cause harm to a network. Additionally, human users may wreak further damage to the system by malicious action. A cyber security system has to identify each of these cyber threats as they evolve.

SUMMARY

A privacy protection component of a cyber threat defense system can automatically comply with a set of privacy requirements when displaying input data. An ingestion module collects input data describing network activity executed by the network entity. A clustering module identifies data fields with data values within the input data from the ingestion module as data identifiable to a network entity using one or more machine-learning models trained on known data fields and their data. The clustering module also clusters the data values with other data values having similar characteristics using at least one machine-learning model trained on known data fields with identified privacy levels used in the network to infer a privacy level associated with that data field. A privacy level is utilized to indicate whether a data value in each of the data fields should be anonymized or remain public. A permission module determines a privacy status of each data field by comparing the privacy level to a permission threshold. An aliasing module applies an alias transform to one or more data values in the set of data fields with a privacy alias to anonymize that data value in that data field based on the privacy status i) assigned by the permission module, ii) manually entered by a system administrator in the graphical user interface, and iii) any combination of both. A user interface module presents to a system user the input data with the privacy alias substituted for that data value in that field.

These and other features of the design provided herein can be better understood with reference to the drawings, description, and claims, all of which form the disclosure of this patent application.

DRAWINGS

The drawings refer to some embodiments of the design provided herein in which:

FIG. 16 illustrates a diagram of an embodiment of an example network to be protected by the cyber threat defense system.

Figure 1:
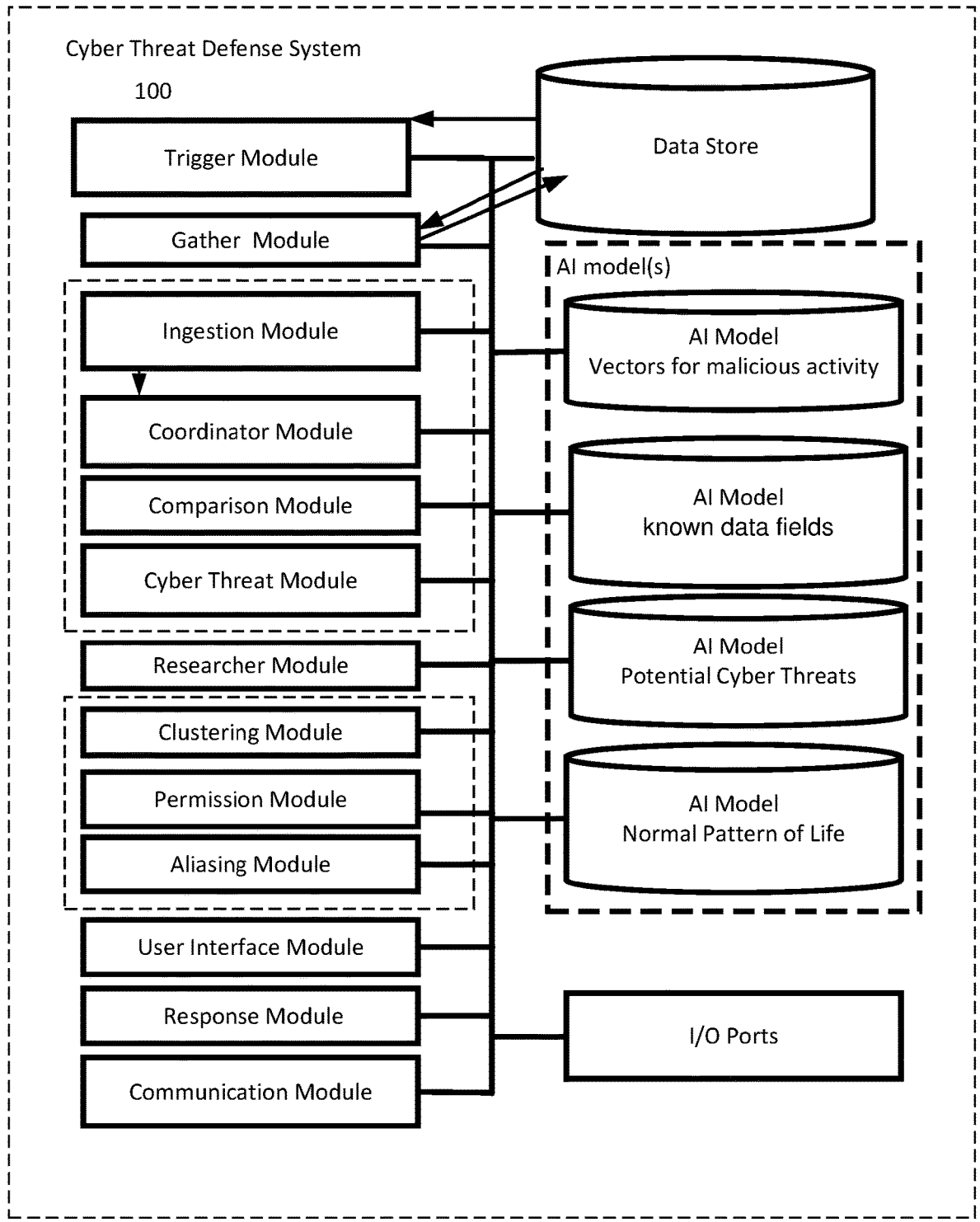
FIG. 1 illustrates a block diagram of an embodiment of a cyber threat defense system with a cyber threat module that references machine-learning models to identify cyber threats by identifying deviations from normal behavior and then anonymize the presented (e.g. displayed, exported, or printed) data.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats.

FIG. 1 illustrates a block diagram of an embodiment of a cyber threat defense system with a cyber threat module that references machine-learning models that are trained on the normal behavior of network activity and user activity associated with a network and then anonymize the presented data. The cyber threat module determines a threat risk parameter that factors in 'the likelihood that a chain of one or more unusual behaviors of email activity, network activity, and user activity under analysis fall outside of derived normal benign behavior;' and thus, are likely malicious behavior.

The cyber threat defense system 100 may protect against cyber security threats from an e-mail system or other communication system, as well as its network. The network may be an Information Technology network, an Operational Technology network, a SaaS environment, a Cloud environment, and any combination of these. The cyber threat defense system 100 may include components such as i) a trigger module, ii) a gather module, iii) a data store, iv) an ingestion module, v) a coordinator module, vi) a comparison module, vii) a cyber threat module, viii) a clustering module, ix) a permission module, x) an aliasing module, xi) a user interface module, xii) an autonomous response module, xiii) a communication module, xiv) at least one input or output (I/O) port to securely connect to other ports as required, xv) one or more machine-learning models such as a first Artificial Intelligence model trained on known data fields with identified privacy levels used in the network, a second Artificial Intelligence model trained on known sensitive data fields and their data, a third Artificial Intelligence model trained on potential cyber threats, and one or more Artificial Intelligence models each trained on different users, devices, system activities and interactions between entities in the system, and other aspects of the system, as well as xiv) other similar components in the cyber threat defense system. Note, the Artificial Intelligence model trained on known data fields with identified privacy levels used in the network and the Artificial Intelligence model trained on known sensitive data fields and their data can be a single Artificial Intelligence model or separate Artificial Intelligence models.

The privacy protection component in the cyber threat defense system may have or cooperate with a set of modules, machine learning models, and one or more input ports connecting to one or more probes deployed for one or more network entities in the network being protected by the cyber threat defense system.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the ingestion module monitoring network and email activity, the comparison module to apply one or more models trained on different aspects of this process, and the cyber threat module to identify cyber threats based on comparisons by the comparison module. While an email module is an example mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data.

An ingestion module can collect input data received i) from a set of probes deployed to a network distributed entity, such as in a third-party Cloud environment, ii) by passive network data ingestion, such as traffic data, through a location within the network, and iii) any combination of both. The network entity can be a user and/or the user's device, as well as another network device interacting with the network. The input data received may describe any activity i) executed by the network entity as well as ii) administrated by a network administrator associated with the network. A network-administrated activity may be network activity, email activity, or other application activity. Further, the ingestion module may be divided into an email module, SaaS module, a Cloud module, and a network module, where each module is configured to monitor and interaction with its corresponding network. The ingestion module monitoring a network entity's activity may feed collected data to a coordinator module to correlate causal links between these activities to supply this input into the cyber threat module.

The cyber threat module may also use one or more machine-learning models trained on cyber threats in the network. The cyber threat module may reference the machine learning models that are trained on the normal behavior of user activity and network activity associated with the network. The cyber threat module can reference these various trained machine-learning models and data from the ingestion module and the trigger module. The cyber threat module can determine a threat risk parameter that factors in how the chain of unusual behaviors correlate to potential cyber threats and 'the likelihood that a chain of one or more unusual behaviors of the network activity and user activity under analysis fall outside of derived normal benign behavior;' and thus, is malicious behavior. In an embodiment, the ingestion module and the coordinator module may be portions of the cyber threat module.

The one or more machine learning models can be self-learning models using unsupervised learning and trained on a normal behavior of different aspects of the network, for example, device activity and user activity associated with a network host, such as a website. The self-learning models of normal behavior are regularly updated via, for example, using unsupervised machine learning algorithms. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. At least one machine-learning model is trained on a normal benign behavior of a network entity. The machine-learning model uses a normal behavior benchmark describing parameters corresponding to a normal pattern of activity for that network entity. The comparison module can use the comparison to identify whether the network entity is in a breach state of the normal behavior benchmark. The cyber threat module can then determine, in accordance with the analyzed metrics and the moving benchmark of what is considered normal behavior, a cyber-threat risk parameter indicative of a likelihood of a cyber-threat. The comparison module can be integrated with the cyber threat module.

The cyber threat defense system 100 may also include one or more machine learning models trained on gaining an understanding of a plurality of characteristics on a network host event and related data including classifying the properties of the network host event and its meta data.

The cyber threat module can generate a set of incident data describing an anomalous event by an entity, here representing a user or a device participating in the network. The cyber threat module can use the incident data to determine whether the anomalous event indicates a breach state representing a malicious incident or confidential data exposure that should be anonymized and shared with a wider subscribed community. To do this, the cyber threat module can use the user interface and display module to present (e.g. display, export, or print) the incident data to a user analyst for review. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails. One or more machine learning models may be trained by observing the activities of external hosts.

The cyber threat defense system can present the input data and identified cyber threats to a system user via a threat-tracking graphical user interface presented by a user interface module. Prior to this presentation, a privacy protection component can remove any personally identifiable data from the presented data. The user interface can also present the breach state and the chain of relevant behavioral parameters with one or more of the data values replaced by a privacy alias.

The privacy protection component may have or cooperate with modules including the ingestion module, a clustering module, a permission module, and an aliasing module, and the machine learning models they cooperate with.

The ingestion module can get input data from an ingested protocol/connection and reduce the data through various algorithms into discrete data values. Each piece of information from the reduction process is a data value (e.g. the time, the name of the device, the operating system, IP addresses, etc.) The clustering module cooperates with one or more one or more machine-learning models trained on known data fields and their data to then map those each of the data values to a corresponding data field. The data fields can be predefined i) coming from a publicly available protocol specification or something similar and/or ii) manually entered by a system administrator, and/or iii) inserted by a module after a machine learning model analyses the network and determines data fields that should at least be included.

In an example, the clustering module knows, for example, a field labelled DestinationField is a data field which contains IP addresses. Note, as discussed in more detail below, the clustering module can cluster the data values of all those data fields. The plotting of the data values can show that, for example, the data value of another data field closely matches the data value of the DestinationField data field. Therefore, if the DestinationField data field is being anonymized, then the data values in the data field closely matching this should also be considered for anonymization.

The clustering module can identify data fields with data values within the input data from the ingestion module as data identifiable to a given network entity using the one or more machine-learning models trained on known data fields and their data. The clustering module can identify all data fields within input data, such as routine data fields of hostnames, email addresses, IP addresses, etc. as well as protocol-specific data fields, such as signatures or ticket hashes. The clustering module does not need to be pre-familiarized with a specific protocol to derive data fields. The clustering module then derives a data value for data in each data field.

The clustering module can cluster the data values with other data values having similar characteristics using at least one machine-learning model trained on known data fields with identified privacy levels used in the network to infer a privacy level associated with that data field. The clustering module possesses a list of defined data fields which usually contain personally identifiable data, such as but not limited to: usernames, passwords, IP addresses, hostnames, etc. The clustering module may then cluster the derived data values of all observed data fields and infer which data fields are closely related to data fields that are predefined as known to contain personally identifiable data. The clustering module can do this by applying one or more clustering techniques to the input data to associate the data value with the data values of existing known data fields. The clustering module clusters the data values with other data values having similar characteristics using at least one machine-learning model trained on known data fields with identified privacy levels used in the network to infer a privacy level associated with that data field.

For example, the clustering module can apply one or more clustering techniques to the input data to associate the data value with a similar data value for a known personally identifiable data field. The clustering module adjusts the privacy level of the data field based on the proximity to the data values of known personally identifiable data fields. The clustering module can thus infer a privacy level associated with the data field to indicate whether the data field likely contains sensitive information; and thus, should not be public. The privacy level can be utilized to indicate whether that data value in that data field should be anonymized. Further, if the associated data value from the predefined data field is closely clustered to the data value by a specific characteristic, such as both containing the same or similar textual strings (e.g. in the case of devices this may indicate two devices with the same owner,) then the privacy aliases chosen for these data values can be linked to show the underlying entities from which they are derived are linked.

Note, the clustering module also does not possess a predefined understanding of what a standard data value looks like in a given data field as different organizations may have different conventions for data fields, such as domain name structure. As the clustering module has no pre-defined understanding of a 'normal' data entry for each data field type, the module avoids a rule-based approach which may fail to anonymize. For example, one organization may use the convention name.surname.device for a data value of device hostnames, where another may use a combination of numbers and letters which is not personally identifiable as a data value. As the clustering module has no expectations of how a hostname should look, the former example should be anonymized due to its data value close clustering with other data values from data fields, such as email address and username. Conversely, the second example will tend towards lower anonymization over time as its data value clusters closely with the data values of data fields that contain no identifiable information.

The clustering module can be configured to extract data values from all observed connections and protocols, these data values can be associated with specific predefined data fields (usually in the protocol specifications). The clustering module generally does not break up the clusters based on whether the data field derives from a particular source (such as a protocol, a device, a credential tracking system). Rather, the clustering module treats all data fields equally, with a few exceptions on an initial predefined list, so that later the clustering module can anonymize protocols that have not been seen before by merely clustering each data field's value(s) without prior assumptions of their purpose.

The clustering module can reference a list of predefined data fields where the data values generally contain personal information. This list stretches from the very obvious personal information (e.g. an email address) to protocol specific (for example, HTTP requests often contain filenames). The clustering module can cluster the data value of each data field with other data values based on the similarity of the data value string (e.g. may be textual, numerical, etc.). Whether the data value should be anonymized is based upon its string similarity to the data values of the data fields which are still on that predefined list.

Over time, data fields with non-sensitive values of data, plotted in a three dimensional plot, will move further and further away from the sensitive data fields as the clustering of data values is refined. Similarly, one of the predefined data fields on the list may move away from the other data fields in the initial predefined list; and therefore, become less and less anonymized on a specific deployment as implemented in that organization, because in that organization or protocol that data field happens not to contain sensitive information. This predefined data field that has moved so far away from the other data fields on the list can be removed or otherwise considered no longer part of the list. This method avoids/gets around any predefinition of what a name or a sensitive bit of data looks like—rather it is defined for the system by the data values of other data fields.

The clustering module sets a default privacy status for all data fields so that the default privacy level triggers anonymization of all data values that have data identifiable to a network entity. The default privacy status for the data field triggers anonymization in the aliasing module. Thus, when a data field is first encountered, the privacy protection component defaults to anonymizing the data value. As the data field is encountered further, the input data provides more information allowing the data field to be more accurately clustered with other data fields. For data fields without personally identifiable information, their location will tend over time to move away from the sensitive information data field clusters and the privacy level assigned to these data fields will consequently reduce. If the clustering module sees data values in a data field with a previously low privacy level but now is starting to contain personally identifiable information, then the updated clustering proximity of its data values will cause the system to raise the privacy level and bring the data field back under anonymization.

The permission module determines a privacy status of the data field by comparing the privacy level of the data field to a permission threshold on a user-by-user basis. The permission level of each system user is configurable to be set on the graphical user interface of the cyber threat appliance. The permission module can reduce the privacy level, when appropriate, by changing the privacy status from, for example, anonymous to public. For example, when the permission module determines that this system user is a system administrator—the highest level of permission, then the privacy status will change from anonymous to public.

The permission module may begin by using a black list and in some cases, a white list also. A black list describes data fields to be anonymized before display. The optional white list describes data fields to be left transparent to a system user. The permission module can build off the black list and the white list to compile an evolving gray list identifying data fields inferred to be subject to anonymization. A user interface module is can be configured to periodically present the evolving gray list to a system administrator to alter a privacy level up or down for one or more of the data fields on the gray list. The system administrator can alter the privacy level up or down for one or more of the data fields on the gray list by entering a gray list edit. The user interface module can receive the gray list edit and pass that gray list edit to the permission module.

The permission module can be configured to determine a geographic location for the system user. The permission module can adjust the permission threshold based on the geographic location. For example, the permission threshold for a first system user in Germany, which typically has stricter privacy laws, can have a lower threshold for causing a data value in a data field to be anonymized than the permission threshold for a second system user with the same permission level as the first system user, but the second system user is geographically located in the United States, which typically has laxer privacy laws than Germany.

The permission module is configurable to assign a permission level to the system user to determine whether the system user is permitted to view the input data subject to i) data values identifiable to any network entity will have a substituted alias when the system user is assigned a full anonymization permission level and ii) data values identifiable to merely any user of the network will have a substituted alias when the system user is assigned a reduced anonymization permission level. The permission module can assign a permission threshold to the system user based on the organizational status of the system user. A system administrator may also select and/or override a permissions threshold for a given system user in the graphical user interface of the cyber threat appliance. Note, when the system user is an external contractor, the permission module may assign a permission level specifying full anonymization for the input data. Full anonymization substitutes privacy aliases for identifiable network entities, such as both users and the domains they visited. If the system user is an internal low-level user, the permission module may assign a permission level specifying reduced anonymization for the input data. The reduced anonymization permission level substitutes privacy aliases for some identifiable network entities, such as Jane's Computer, but leaves some data values for other identifiable network entities, such as domain names and other company-identifiable entity but not employee-identifiable information, visible.

An aliasing module can apply an alias transform to the data value in a data field with a privacy alias to anonymize the data value in the data field based on the privacy status i) assigned by the permission module, ii) manually entered by a system administrator in the graphical user interface, and iii) any combination of both. The aliasing module can assign associated privacy aliases to data values which are closely clustered when these data values share one or more specific characteristics in common. The assigned associated privacy aliases a link of the privacy alias of one data value to the privacy alias of an associated data value. For example, Jane-phone and Jane-laptop could be aliased as a46b-device1 and a46b-device2. These two data values share the common characteristic of being a host device associated with Jane. Alternately, an operator may choose that data values which that seemingly do not share any common characteristics; in which case, the two devices could have completely unrelated aliases. In such an example, a system user would still be shown the connection in the graphical user interface if the two devices were seen communicating within the network. For further anonymization, the aliasing module can be configured to assign a privacy alias on a per session-basis so that a fresh privacy alias is generated for the data value for each session. For example, the data value of Jane-phone could have alias a46gf in a first session, then have the alias r39ti in a second session the next day.

The user interface module can display to a system user the input data with the privacy alias from the aliasing module substituted for the data value in that data field. Further, the aliasing module can generate an export set of the received input data mixed in with instances of one or more data values replaced with their privacy alias. A communication module on the cyber threat appliance can export the anonymized set of input data in common export formats such as JSON, Common Event Format, emails, PDF format, etc.

The cyber threat defense system 100 may supplement the data provided to the users and cyber professionals using a researcher module. The researcher module operates an artificial intelligence (AI) algorithm to assess whether the anomalous network activity has previously appeared in other published threat research or known lists of malicious files or internet addresses. The researcher module can consult internal threat databases or external public sources of threat data. The researcher module can collect a research data set describing at least one of an action or a state related to the cyber threat present outside of the network from at least one data source outside the network.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The autonomous response module can interact with the cyber threat module to automatically respond to any identified cyber threats. The cyber threat module may analyze the input data from any probes at a network entity to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. The autonomous response can be, for example, reducing permissions of the network entity or disabling a user account of the network entity. A communication module can send an alert of the cyber threat with a suggested response to the cyber threat to an internal system administrator.

The cyber threat defense system 100 may be hosted on a device, on one or more servers, or in its own cyber threat appliance platform.

Figure 2:
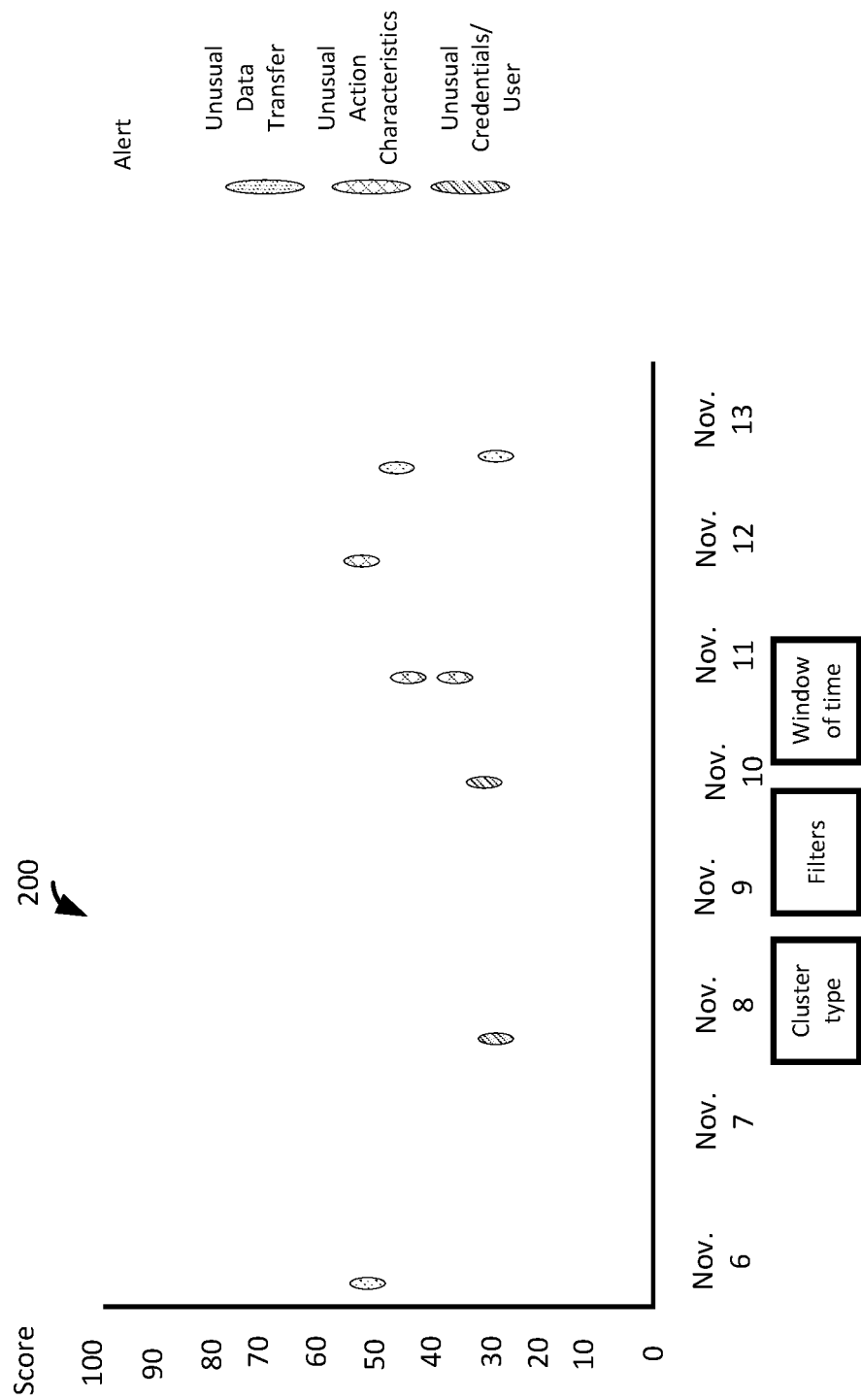
FIG. 2 illustrates a block diagram of an embodiment of an example chain of unusual behavior in connection with the rest of the network under analysis.

FIG. 2 illustrates a block diagram of an embodiment of an example chain of unusual behavior for the network entity in connection with the rest of the network under analysis.

The user interface can display a graph 200 of an example chain of unusual behaviors for the network entity in connection with the rest of the network under analysis.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network entity, such as a network, a system, a device, a user, or an email, under analysis by the cyber threat module and the machine-learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a behavior of a malicious actor, such as a human, a program, an email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in network actions in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of automatic response actions, if any, the defense system may take when for different types of cyber threats that are equal to or above a configurable level of threat posed by this malicious actor.

The cyber threat module may chain the individual alerts and events that form the unusual pattern into a distinct item for cyber threat analysis of that chain of distinct alerts or events. The cyber threat module may reference the one or more machine-learning models trained on e-mail threats to identify similar characteristics from the individual alerts or events forming the distinct item made up of the chain of alerts or events forming the unusual pattern.

One or more machine-learning models may also be trained on characteristics and aspects of all manner of types of cyber threats to analyze the threat risk associated with the chain or cluster of alerts or events forming the unusual pattern. The machine-learning technology, using advanced mathematics, can detect previously unidentified threats, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived, each producing time series data for the given metric.

The detectors in the cyber threat module including its cooperating module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, and network activity in the system being protected by the cyber threat defense system.

As discussed, each machine-learning model may be trained on specific aspects of the normal pattern of life for the system such as devices, users, network traffic flow, outputs from one or more cyber security analysis tools analyzing the system, email contact associations for each user, email characteristics, and others. The one or more machine-learning models may use at least unsupervised learning algorithms to establish what is the normal pattern of life for the system. The machine-learning models can train on both i) the historical normal distribution of alerts and events for that system and ii) a normal distribution information from similar peer systems to establish the normal pattern of life of the behavior of alerts or events for that system. Another set of machine-learning models train on characteristics of emails and the activities and behavior of its email users to establish a normal for these.

The models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine-learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'normal behavior' to support or refute each possible hypothesis of what could be happening with this chain of unusual behavior under analysis.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine-learning models, that distinct chain of alerts or events can be determined to now have a much higher threat risk than any of the individual and/or events in the chain.

In addition, modern cyber-attacks can be of such severity and speed that a human response cannot happen quickly enough. Thanks to these self-learning advances, a machine may uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine-learning constantly revisits assumptions about behavior, using probabilistic mathematics. The cyber threat defense system's unsupervised machine-learning methods do not require training data with pre-defined labels. Instead, unsupervised machine-learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns. These similarities of events or alerts in the chain may be, for example, alerts or events are coming from same device, same user credentials, same group, same source identifiers, same destination Internet Protocol addresses, same types of data transfers, same type of unusual activity, same type of alerts, same rare connection being made, same type of events, or others, so that a human can visually see what spatially and content-wise is making up a particular chain rather than merely viewing a textual log of data. Note, once the human mind visually sees the projected pattern and corresponding data, then the human can ultimately decide if a cyber threat is posed. Again, the at least three-dimensional projection helps a human synthesize this information more easily. The visualization onto the user interface allows a human to see data that supports or refutes why the cyber threat defense system thinks these aggregated alerts or events could be potentially malicious. Also, instead of generating the simple binary outputs 'malicious' or 'benign,' the cyber threat defense system's mathematical algorithms produce outputs that indicate differing degrees of potential compromise.

Defense System

Figure 3:
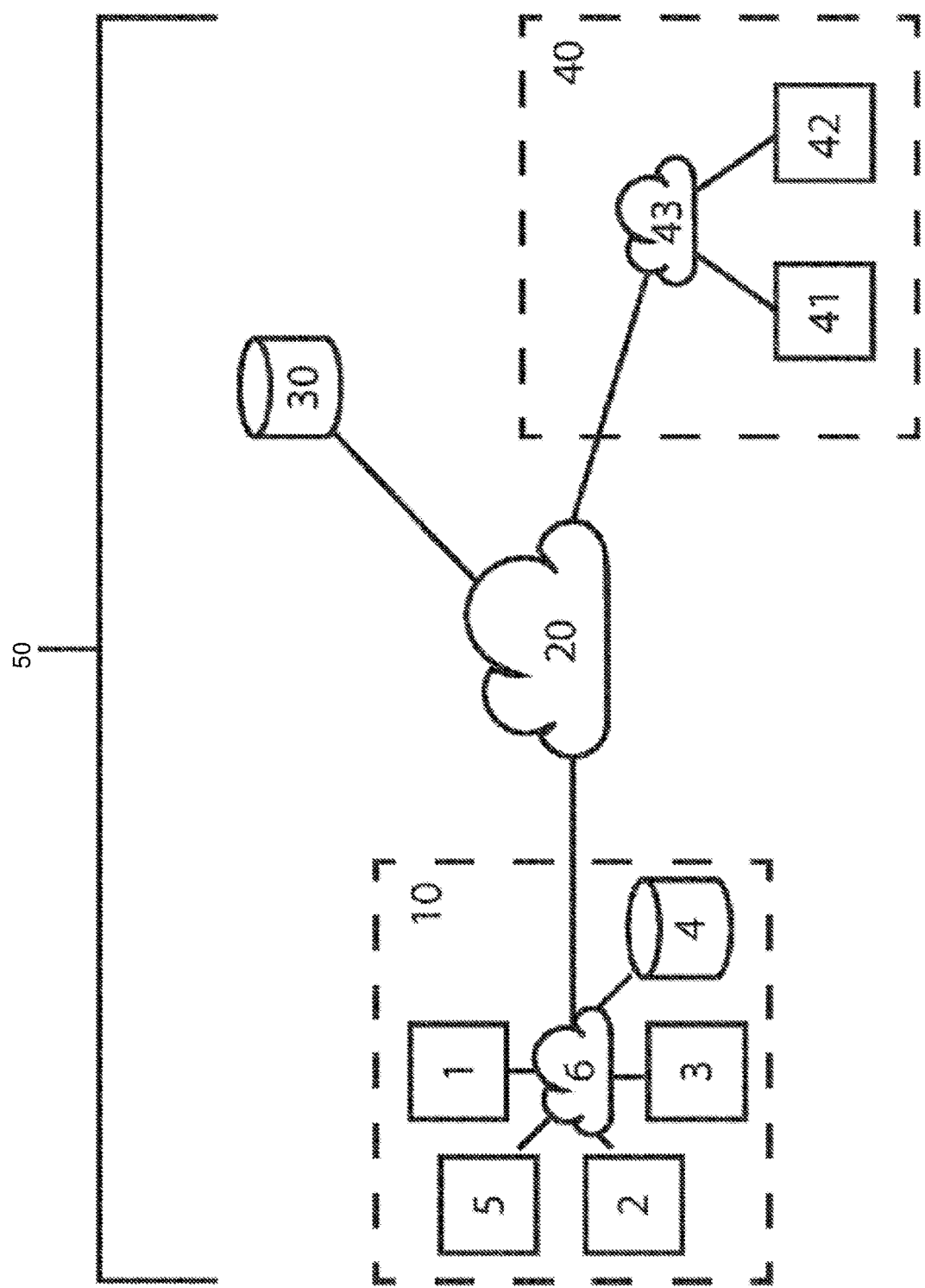
FIG. 3 illustrates a diagram of an embodiment of an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the cyber threat defense system installed on the computer 1.

Figure 4:
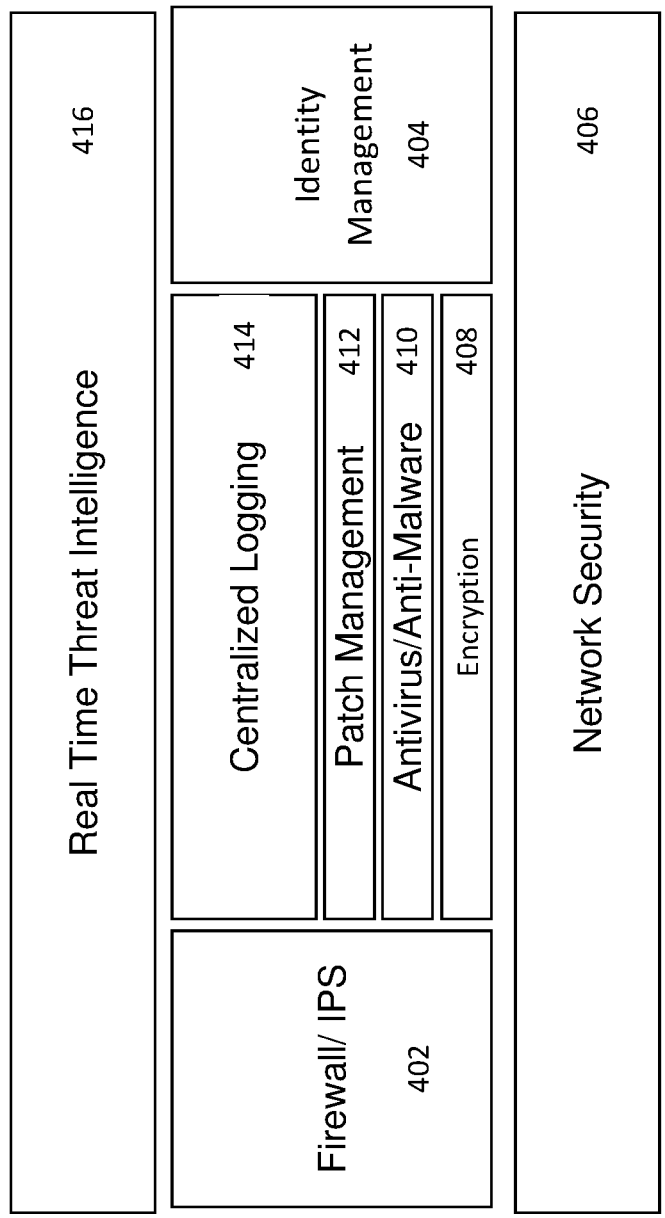
FIG. 4 illustrates in a block diagram of an embodiment of the integration of the threat detection system with other network protections.

FIG. 4 illustrates in a block diagram the integration of the threat detection system with other network protections. A network generally has a firewall 402 as a first line of defense. The firewall 402 analyzes packet headers on incoming network data packets to enforce network policy. The firewall 402 may be integrated with an intrusion prevention system (IPS) to analyze the packet header and payload for whole events. Internally, an identity management module 404 controls the access for the users of the network.

A network security module 406 can enforce practices and policies for the network as determined by a network administrator. An encryption module 408 can encrypt communications within the network, as well as encrypting and decrypting communications between network entities and outside entities. An anti-virus or anti-malware module 410 may search packets for known viruses and malware. A patch management module 412 can ensure that security applications within the network have applied the most up-to-date patches. A centralized logging module 414 may track communications both internal to and interactive with the network. The cyber threat defense system can act as real time threat intelligence 416 for the network. The real time threat intelligence may interact with the other defense components to protect the network.

The cyber threat defense system uses machine-learning technology to self-learn on this network and its entities that the components of the cyber threat defense system are protecting. The machine-learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system may self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

This intelligent system may make value judgments and carry out higher value, more thoughtful tasks. Machine-learning requires complex algorithms to be devised and an overarching framework to interpret the results produced. However, when applied correctly these approaches can facilitate machines to make logical, probability-based decisions and undertake thoughtful tasks.

Advanced machine-learning is at the forefront of the fight against automated and human-driven cyber-threats, overcoming the limitations of rules and signature-based approaches. For example, the machine-learning learns what is normal within a network without depending upon knowledge of previous attacks. The machine-learning thrives on the scale, complexity, and diversity of modern businesses, where every device and person is slightly different. The machine-learning turns the innovation of attackers against them, so that any unusual activity is visible. The machine-learning constantly revisits assumptions about behavior, using probabilistic mathematics. The machine-learning is always up to date and not reliant on human input. Utilizing machine-learning in cyber security technology is difficult, but when correctly implemented it is extremely powerful. The machine-learning means that previously unidentified threats can be detected, even when their manifestations fail to trigger any rule set or signature. Instead, machine-learning allows the system to analyze large sets of data and learn a 'pattern of life' for what it sees.

Figure 5:
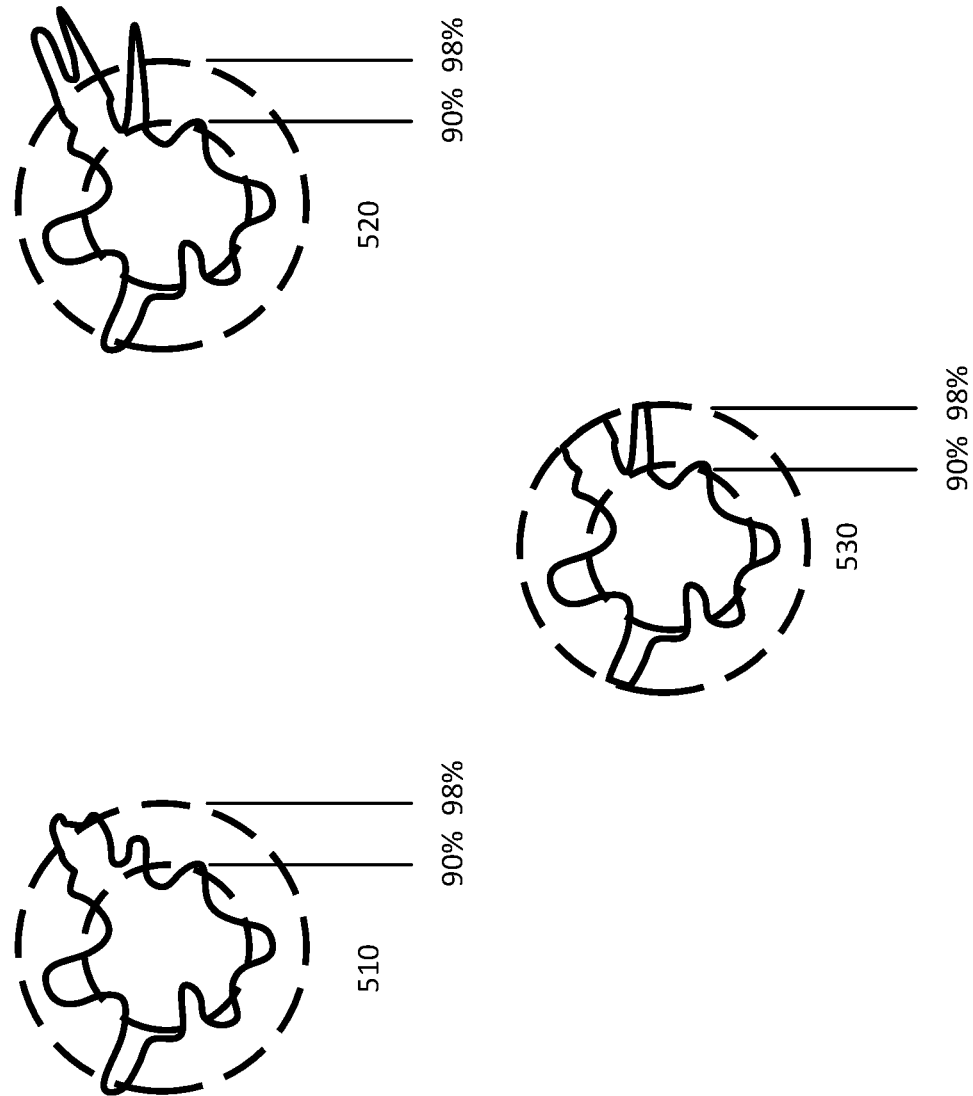
FIG. 5 illustrates a diagram of an embodiment of an application of a cyber threat defense system using advanced machine-learning to detect anomalous behavior.

FIG. 5 illustrates an application of a cyber threat defense system using advanced machine-learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

Machine-learning can approximate some human capabilities to machines. Machine-learning can approximate thought by using past information and insights to form judgments. Machine-learning can act in real time so that the system processes information as it goes. Machine-learning can self-improve by constantly challenging and adapting the model's machine-learning understanding based on new information.

New unsupervised machine-learning algorithms therefore allow these AI models to recognize evolving threats, without prior warning or supervision.

Unsupervised Machine-Learning

Unsupervised learning works things out without predefined labels, such as all of the data fields having consistent labels. This allows the system to handle the unexpected and embrace uncertainty. The system does not always know the characteristics of the target of the search but can independently classify data and detect compelling patterns.

The cyber threat defense system's unsupervised machine-learning methods do not require training data with predefined labels. Instead, unsupervised machine-learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine-learning on cyber security is transformative. Threats from within, which would otherwise go undetected, can be spotted, highlighted, contextually prioritized, and isolated using these algorithms. The application of machine-learning has the potential to provide total network visibility and far greater detection levels, ensuring that networks have an internal defense mechanism. Machine-learning has the capability to learn when to execute automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

On a core level, the cyber threat defense system mathematically characterizes what constitutes 'normal' behavior based on the analysis of a large number of different measures of network behavior by a device. Such network behavior may include server access, data access, timings of events, credential use, domain name server (DNS) requests, and other similar parameters. Each measure of network behavior is then monitored in real time to detect anomalous behaviors.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

The inoculation module may also use clustering to identify which devices to send an inoculation notice. The inoculation module may select devices that have similar characteristics relevant to the anomalous event.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many inter-related features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. The mathematical models continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine-learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Figure 6:
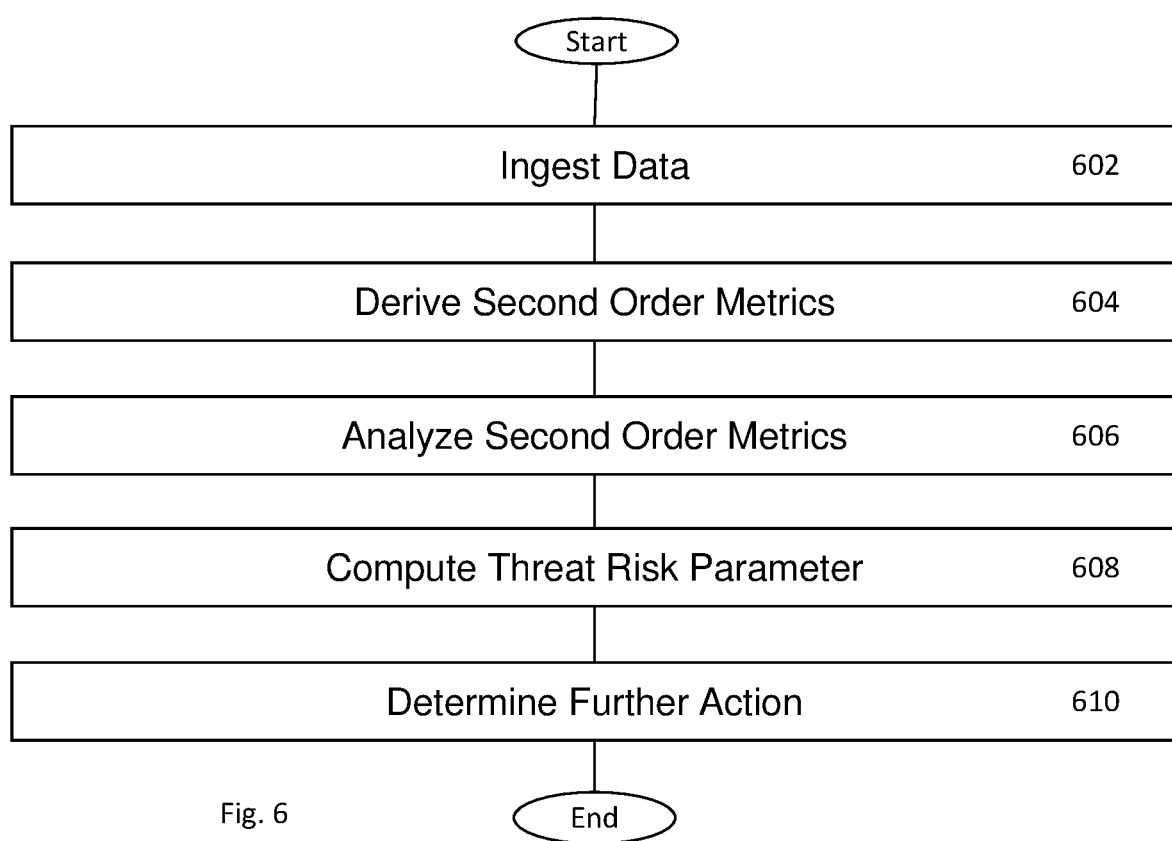
FIG. 6 illustrates a flowchart of an embodiment of a method for modeling human activity, machine activity, or other activity.

FIG. 6 illustrates a flowchart of an embodiment of a method for modeling human, machine or other activity. The cyber threat defense system initially ingests data from multiple sources (Block 602). The raw data sources include, but are not limited to raw network Internet Protocol (IP) traffic captured from an IP or other network Test Access Points (TAP) or Switched Port Analyzer (SPAN) port; machine generated log files; building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

The cyber threat defense system derives second order metrics from that raw data (Block 604). From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, the cyber threat defense system commonly obtains multiple metrics relating to a wide range of potential threats. Communications from components in the network contacting known suspect domains.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors carry out analysis of the second order metrics (Block 606). Detectors are discrete mathematical models that implement a specific mathematical method against different sets of variables with the target network. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

The threat detection system computes a threat risk parameter indicative of a likelihood of there being a threat using automated adaptive periodicity detection mapped onto observed behavioral pattern-of-life analysis (Block 608). This deduces that a threat over time exists from a collected set of attributes that themselves have shown deviation from normative collective or individual behavior. The automated adaptive periodicity detection uses the period of time the Bayesian probabilistic has computed to be most relevant within the observed network or machines. Furthermore, the pattern of life analysis identifies how a human or machine behaves over time, such as when they typically start and stop work. Since these models are continually adapting themselves automatically, they are inherently harder to defeat than known systems. The threat risk parameter is a probability of there being a threat in certain arrangements.

Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning or Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of, for example, a laptop. If the attack escalates, the cyber threat defense system may ultimately quarantine a device to prevent wider harm to an organization.

In order to improve the accuracy of the system, a check can be carried out in order to compare current behavior of a user with associated users, such as users within a single office. For example, if there is an unexpectedly low level of activity from a user, this may not be due to unusual activity from the user, but rather a factor affecting the office as a whole. Various other factors can be considered in order to assess whether abnormal behavior is actually indicative of a threat.

Finally, the cyber threat defense system determines, based on the threat risk parameter, as to whether further action need be taken regarding the threat (Block 610). A human operator may make this determination after being presented with a probability of there being a threat. Alternately, an algorithm may make the determination, such as by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprise a data structure that decides on a rolling continuum rather than a stepwise method in which recurring time cycles, such as the working day, shift patterns, and other routines are dynamically assigned, thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

Figure 7:
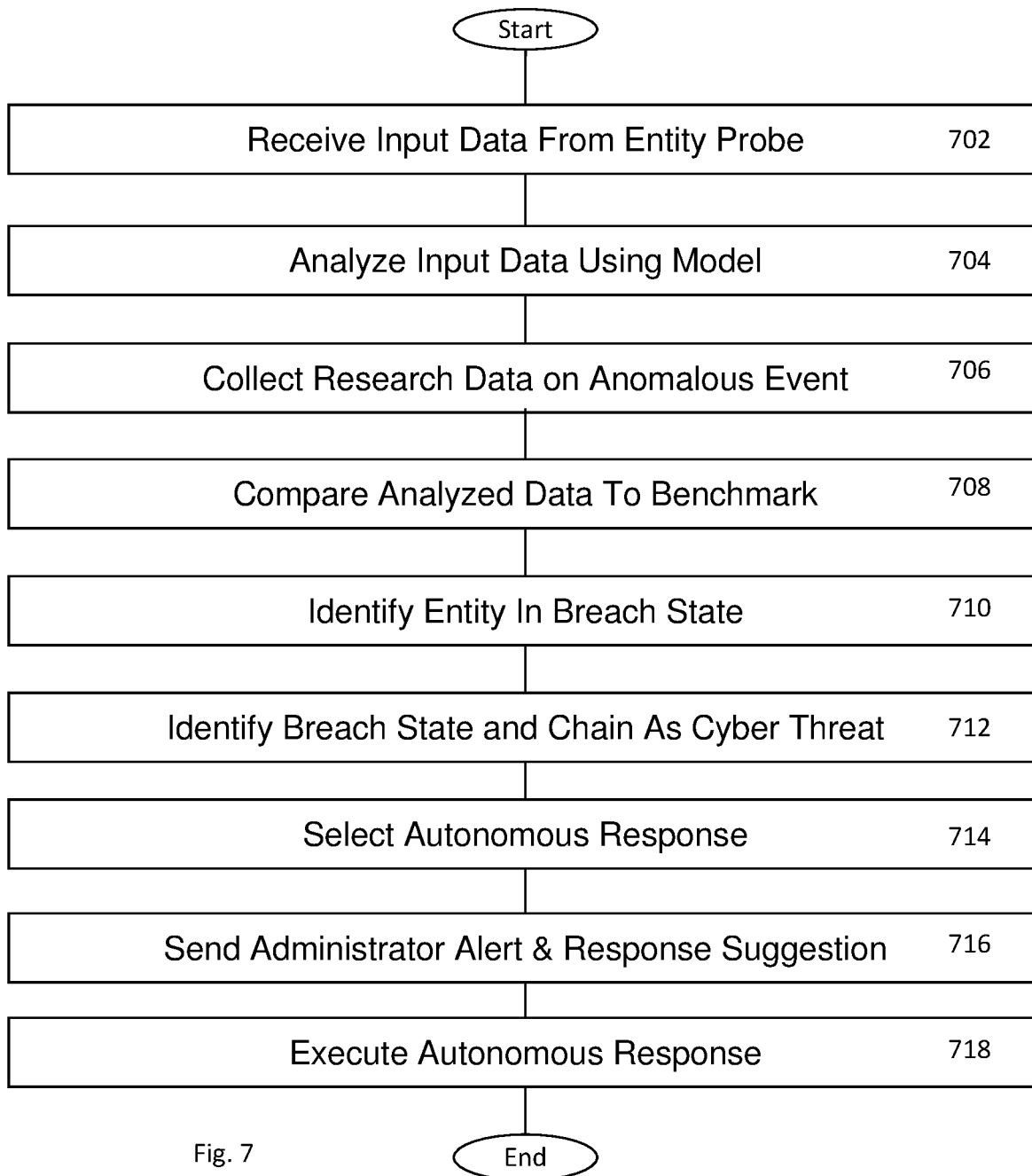
FIG. 7 illustrates a flowchart of an embodiment of a method for identifying a cyber threat.

Once the cyber threat has been identified, the cyber threat defense system can perform an autonomous response. FIG. 7 illustrates a flowchart of an embodiment of a method for identifying a cyber threat and performing an autonomous response. The privacy protection component cyber threat defense system can receive, via at least one input port, input data from, for example, a probe monitoring a network entity, such as a user, a device, etc., on a network being protected by the cyber threat defense system (Block 702). The cyber threat defense system has a cyber threat module configured to analyze the input data using one or more machine-learning model to spot behavior on the network deviating from a normal benign behavior of that network entity (Block 704). The one or more machine-learning models are initially trained on generic normal benign behavior of a generic network entity using a normal behavior benchmark describing parameters corresponding to a normal pattern of activity for that network entity. However, the machine-learning models are then specifically trained on a regular basis on the normal benign behavior of the network entities in the network that they are modeling. Each model can be trained on a separate network entity and/or a class of network entities. The cyber threat defense system has a researcher module configured to collect an outside data set describing at least one of an outside action and an outside state related to the input data from at least one data source outside the network (Block 706). The cyber threat defense system has a comparison module that compares the input data to a machine-learning model to spot behavior on the network deviating from a normal benign behavior of that network entity (Block 708). The comparison module can identify whether the network entity is in a breach state of the normal behavior benchmark (Block 710). The cyber threat module can identify whether the breach state and a chain of relevant behavioral parameters deviating from the normal benign behavior of that network entity correspond to a cyber threat (Block 712).

The cyber threat defense system can use an autonomous response module configured to select an autonomous response to take in response to the cyber threat (Block 714). The autonomous response can be, for example, reducing permissions of the network entity or disabling a user account of the network entity. The autonomous response module can send an alert of the cyber threat with a suggested response to the cyber threat to an internal system administrator (Block 716). The autonomous response module can execute the autonomous response in response to the cyber threat (Block 718).

The method and system can be arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Privacy Protection Component

In an embodiment, a "privacy protection" component, such as the modules and models, shown in FIG. 1, cooperating with each other and discussed throughout this document, can allow the automated self-learning cyber threat defense system to operate in its full capacity whilst anonymizing the findings and discoveries of threats. When privacy mode is activated, the cyber threat defense system continues to self-learn, monitor, and autonomously respond with full effectiveness. However, any information presented to security analysts is subject to constraints or obscured to avoid unnecessary invasion of privacy.

In privacy mode, the privacy protection component takes measures to protect individual or corporate privacy. The privacy protection component can redact the identity of individuals and devices displayed into the cyber defense user interface (UI), smart phone application, or automated reporting. The privacy protection component can replace the identity of individuals and devices with an anonymized alias i) consistent across all system users, ii) consistent on a per-user basis or iii) consistent for a single login-session only. If further investigation or cyber defense action requires the full identification of the person or device involved, then the system user can request de-anonymization from an authorized person who can grant or deny de-anonymization on a case by case basis.

For example, a company may operate a cyber defense solution across digital environments with a national or company culture that highly values privacy, such as Germany. Alternately, a company may operate a cyber defense solution across digital environments under a legal regime in which workers rights preclude the observation of computer based behaviors, such as Italy. Company (A) may be part of the supply chain of Company (B), and has agreed that Company (B) is allowed to monitor the cyber defense situation in some of their digital environments. Company (C) may be potentially acquired by Company (D) and has agreed that Company (D) can review the cyber defense situation to understand the risks of remedial costs or the risk that intellectual property is no longer a secret contained within the company as it has been copied by attackers.

Privacy mode does not change the data retention capabilities of the platform. Further, privacy mode does not limit the ability to store data that might be of use in future investigations, or support to law enforcement or legal process activities.

In an embodiment, the privacy protection component is configured to evaluate any network's overall security and threat protection capabilities without violating the privacy laws. A "privacy protection" component is configured to allow the automated self-learning cyber defense system to operate in its full capacity whilst anonymizing the findings and discoveries of threats when presented to the security analyst audience and during investigation. This privacy mode allows privacy-aware communities to adopt advanced cyber defenses without concern about oversight. The privacy mode also allows different organizations to collaborate on cyber security, such as a subcontractor.

The cyber threat defense system passively collects raw network data as the data flows across the network. The analysis of raw data flow may not include the content of data files. However, the information collected is used to correlate data between the source and the receiver for a given traffic session. To do this, the cyber threat defense system extracts metadata from rich data flow. The cyber threat defense system applies mathematical algorithms to check for anomalous or suspicious behaviors inside the network.

The cyber threat defense system stores extracted metadata in a rolling buffer on the appliances within the customer site, expiring stored data as disk space requires. The cyber threat defense system does not provide full packet capture storage designed for indefinite storage. The cyber threat defense system only stores such data that is required for security forensics or required for the purposes of reproducing an error. The customer can back up this data elsewhere, if required. The amount of metadata stored on the appliance is configurable. Additional controls define who can access data on the appliance and what data they can access.

The cyber threat defense system can also store data such as logs of user network activity, file share access, website browsing, and other personal data. A privacy protection component can protect this data from being viewed by improper individuals.

When privacy mode is enabled, the privacy protection component can anonymize, for example, the last octet of an Internet Protocol, version 4 (IPv4) address. In this example, the privacy protection component can anonymize 192.168.10.22 as 192.168.10.#5623637. When privacy mode is enabled, the privacy protection component can be configured to anonymize the least important 64 bits of a version 6 (IPv6) address, in practice generally located as the last four segments (or hextets). Due to the nature of IPv6, a system administrator would be required to declare a range of IPv6 addresses as internal and therefore eligible for anonymization. The privacy protection component can anonymize hostnames. For example, the privacy protection component can anonymize some.companydomain.internal to #6974920. The privacy protection component can randomize or entirely obscure credentials based on system-user permissions. The privacy protection component can prevent the generation of packet captures. The privacy protection component can restrict access to expanded meta data search procedures.

Figure 8:
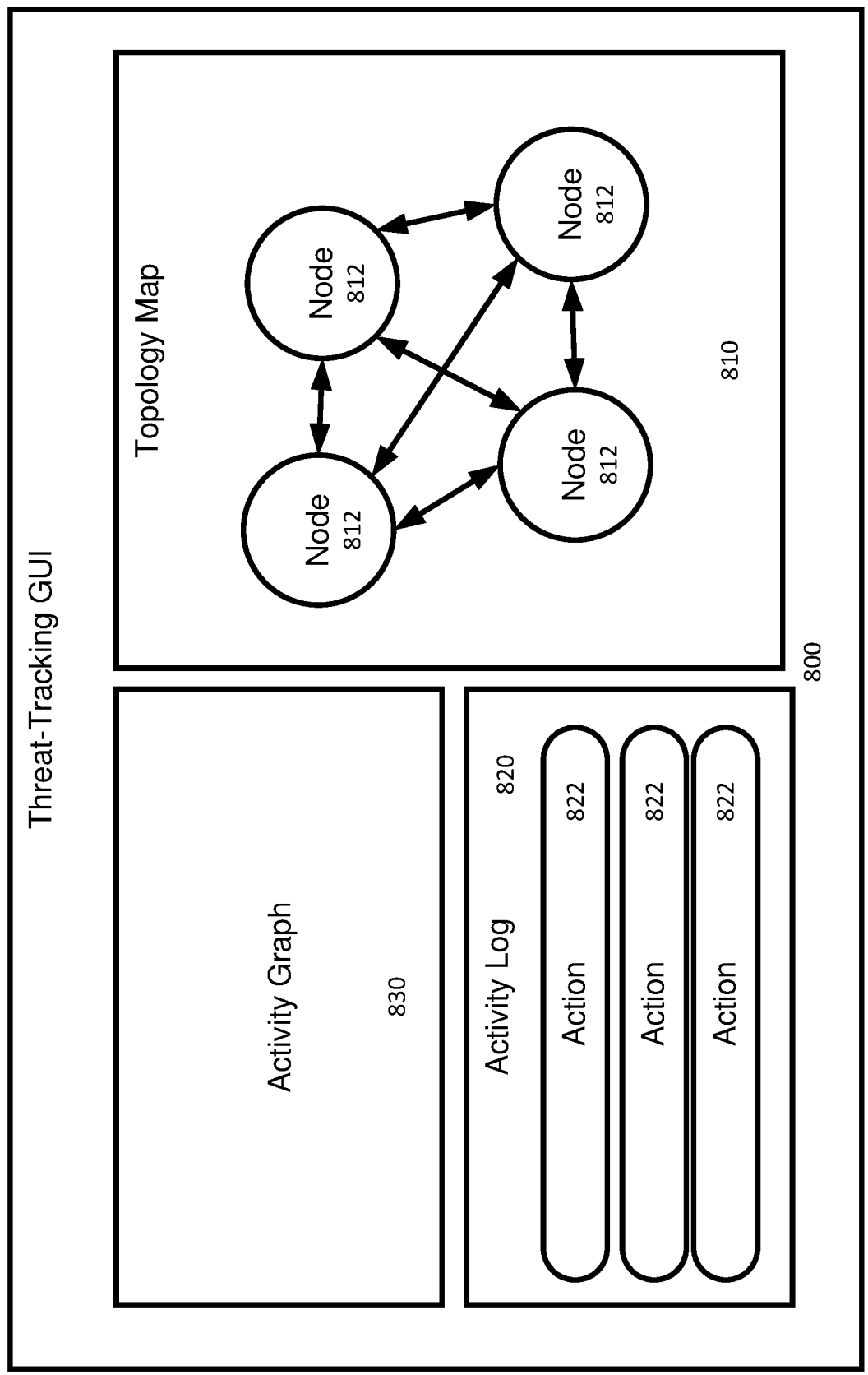
FIG. 8 illustrates a block diagram of an embodiment of a threat-tracking graphical user interface.

FIG. 8 illustrates a block diagram of a threat-tracking graphical user interface 800. The threat-tracking graphical user interface 800 may have a topology map 810 displaying a two-dimensional or three-dimensional representation of the network. The topology map 810 can have one or more network nodes 812 acting as a visual avatar for a network entity on the network. The topology map 810 can illustrate each connection between a network node 812 and any other network node 812 in contact with that network node 812. A network node 812 can be marked to indicate an issue with the represented network entity. The user analyst can select a network node 812 with the cursor to reveal more information about the represented network entity.

Upon the selection of a network entity via selection of the network node 812, the threat-tracking graphical user interface can display an action log 820 for that network entity. The action log 820 may list an action line 822 describing each action by that network entity over a set period. The threat-tracking graphical user interface 800 can append an alert to an action line 822 to indicate a hazard to the network. The threat-tracking graphical user interface can use the action log 820 to generate an activity graph 830 to show the amount of activity over time. The user analyst can identify problem network entities by identifying spikes in the activity graph. The user analyst can filter the action log 820 or the activity graph 830 based on user specified criteria, such as action type, entity type, time period, or threat level.

Figure 9:
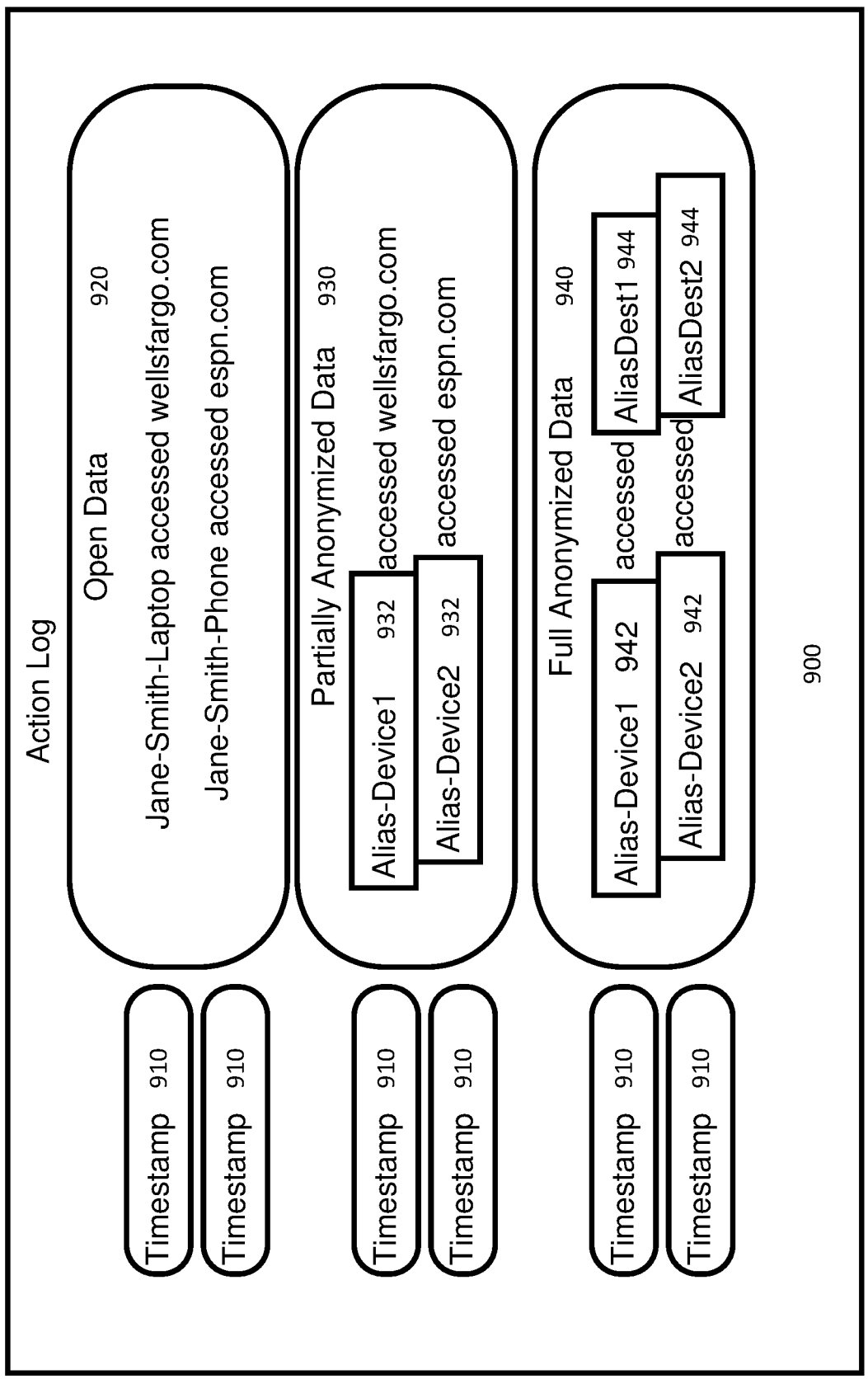
FIG. 9 illustrates a block diagram of an embodiment of an anonymized action log.

Certain data displayed in this action log may not be suitable for display to certain system users. Specific countries, such as Germany, may have privacy protection laws in place that prohibit displaying the websites visited by an employee to an employer or an outside contractor. To comply with these privacy concerns and laws, an aliasing module can replace identifying information in the action log, such as user names, device names, and domain names. FIG. 9 illustrates a block diagram of an anonymized action log 900 anonymized by the privacy protection component.

The action log 900 may have an action line describing an action executed by the network entity. The action log may associate each action line with a data value, such as a timestamp 910, associated with the data field of time indicating when the action occurred. The action log may present open data, such as JaneSmith Laptop accessed wellsfargo.com, to a specific system user. Jane-Smith-Laptop is a data value that is personally identifiable with the user's host device and associated with a host device data field. Wellsfargo.com is also a data value but associated with a different data field of a destination URL data field. Likewise, in the other example data, Jane-Smith-Phone is a data value that is personally identifiable with the user's host device and associated with a host device data field. Espn.com is also a data value but associated with a different data field of a destination URL data field. The open data values 920 provide unredacted action lines. Generally, the action log provides open data values 920 merely to a system user who is a high-level administrator within the organization, and only when a cyber threat has been identified.

The privacy protection component may present on the action log partially anonymized data values 930. The privacy protection component anonymizes some of the data values 930 identifiable to a network entity for system users with medium/lower permission levels as set by the permissions module or manually by a system administrator in the graphical user interface. The partially anonymized data values 930 may replace user specific identifying information with a privacy alias. The privacy alias may be a unique alias, so that no connection exists between aliases. Alternately, the privacy alias may be a connected alias 932. In a connected alias 932, if a user is using multiple devices, a section of the alias for each device indicates that the devices are linked in some manner.

The action log may present on a display, exported data, written report, etc., partially anonymized data values 930 to a system user who is a lower level member of the organization. In this example, the data value for Jane-Smith-Laptop which is in a host device data field has been transformed with a privacy alias 932 to Alias-Device1. The wellsfargo.com data value in the destination URL data field has been left open to the public. Likewise, the Jane-Smith-Phone data value that is personally identifiable with the user's host device has been transformed with a privacy alias 932 to Alias-Device2. The espn.com data value in the destination URL data field has been left open to the public.

The privacy protection component may present on the action log fully anonymized data values 940 to a system user. Fully anonymized data values 940 replaces any data value with its identifiable information to a network entity, received in the input data, with a privacy alias. Like before, a privacy alias of Alias-Device #942 is substituted for user identifiable information and a privacy alias of AliasDestination # for a domain name such as espn.com or wellsfargo.com.

The privacy protection component by default provides fully anonymized data values 940 whenever, for example, the action log is the shared outside the organization. When the action log is being reviewed to identify cyber threats, an outside contractor can use fully anonymized data values 940 to identify a pattern of aberrant behavior. The outside contractor can then flag a set of input data for review by an internal system analyst. The internal system analyst with a better permissions level can review partially anonymized data values 930 to identify outside threats, such as domains harboring malware. If partially anonymized data values 930 indicate that a problem is being caused by a member of the organization, the system analyst can flag the input data for review by a system administrator. The privacy protection component decloaks the partially anonymized data 930 for system administrator to look at the open data 920.

A major difficulty in maintaining the proper level of privacy as mandated by law is identifying which data fields are to be rendered anonymous. While a black list can identify data fields to be rendered anonymous or a white list can identify data fields that can be open to the public, no black list or white list can identify every necessary data field. The privacy component can use the clustering module to determine whether a "gray list" data value is to be rendered anonymous or left public.

Figure 10:
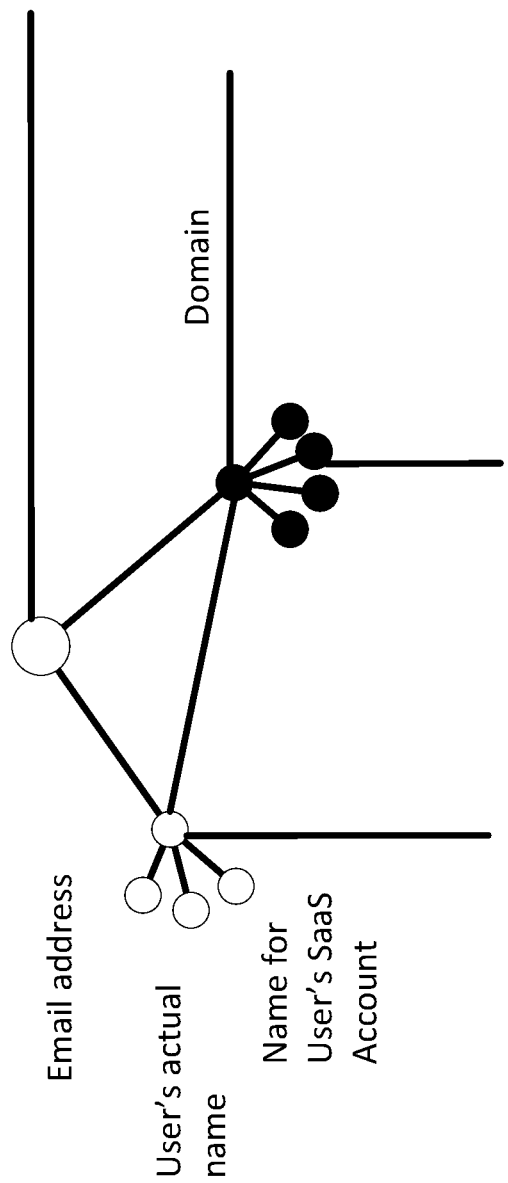
FIG. 10 illustrates a block diagram of an example cluster.

FIG. 10 illustrates a block diagram of an example cluster. Clustering can be leveraged to properly identify personally identifiable data for purposes of anonymization. A data value within the input data may be clustered with the data values of a predefined list of data fields which generally contain personally identifiable information to indicate whether the data field should be anonymized. A clustering module can cluster the data values to identify whether the data field usually contains information to be anonymized.

For example, if that data field represents a username for a SaaS account on the extended network, a clustering module will likely cluster the data value of the username for that SaaS account with data values of other data fields, such as email address, due to similar data values. As an email address is a data field with known personally identifiable data, the cluster module can infer a privacy level based upon this proximity. The clustering module can also see in this example input data of a domain name visited by a user. The domain name value does not cluster closely with known personally identifiable data fields and so a lower privacy level is inferred. The clustering module can update the list of known personally identifiable fields from those which consistently cluster closely with the existing known data fields.

Figure 11:
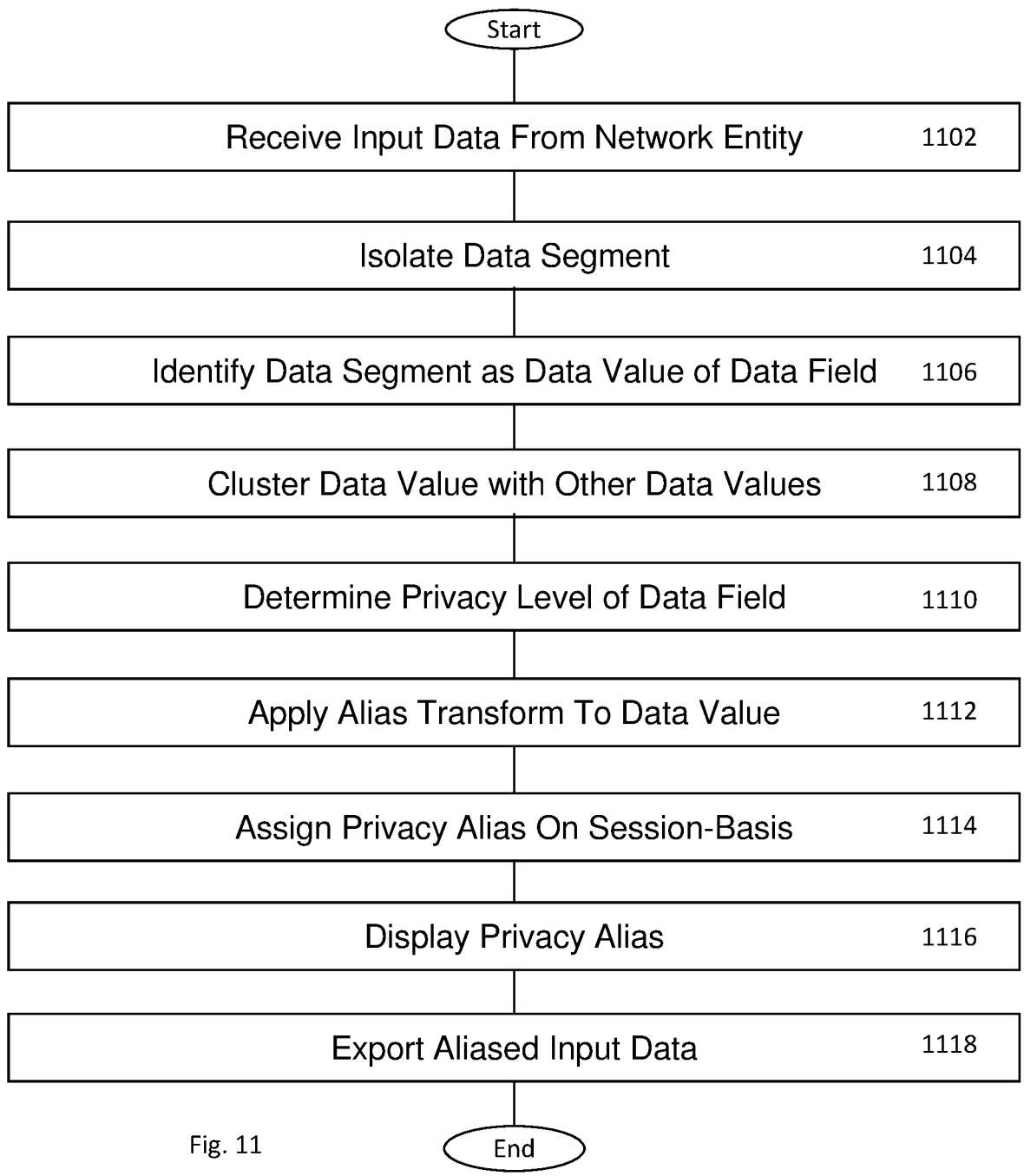
FIG. 11 illustrates a flowchart of an embodiment of a method for anonymizing an action log.

FIG. 11 illustrates a flowchart of an embodiment of a method for anonymizing a breach event log. The privacy protection component in a cyber threat defense system complies with a set of privacy requirements when displaying input data. The ingestion module receives the input data from, for example, a probe monitoring a network entity (Block 1102). The network entity can be a user, a device, etc., associated with this network. The clustering module isolates a data segment within the input data (Block 1104). The clustering module identifies the data segment as a data value for a data field handled by the network entity (Block 1106). The clustering module identifies data fields with data values within the input data as data identifiable to the network entity using one or more machine-learning models trained on known data fields and their data. The clustering module clusters the data values with other data values having similar characteristics using at least one machine-learning model trained on known data fields with identified privacy levels used in the network to infer a privacy level associated with each data field. A privacy level can be utilized to indicate whether the data value in a data field should remain public or be anonymized (Block 1108). The permission module determines a privacy status of a data field by comparing the privacy level to a permission threshold (Block 1110). The aliasing module applies an alias transform to the data value in the data field with a privacy alias to anonymize that data value in that data field (Block 1112). The aliasing module can be configured to assign a privacy alias on a per session-basis so that a fresh privacy alias is generated for the data values for each session (Block 1114). The user interface module presents a threat-tracking graphical user interface to display to a system user the input data with the privacy alias from the aliasing module substituted for one or more data values in the data fields (Block 1116). The communication module exports the received input data mixed in with instances of one or more data values each replaced with possibly different privacy alias (Block 1118).

Figure 12:
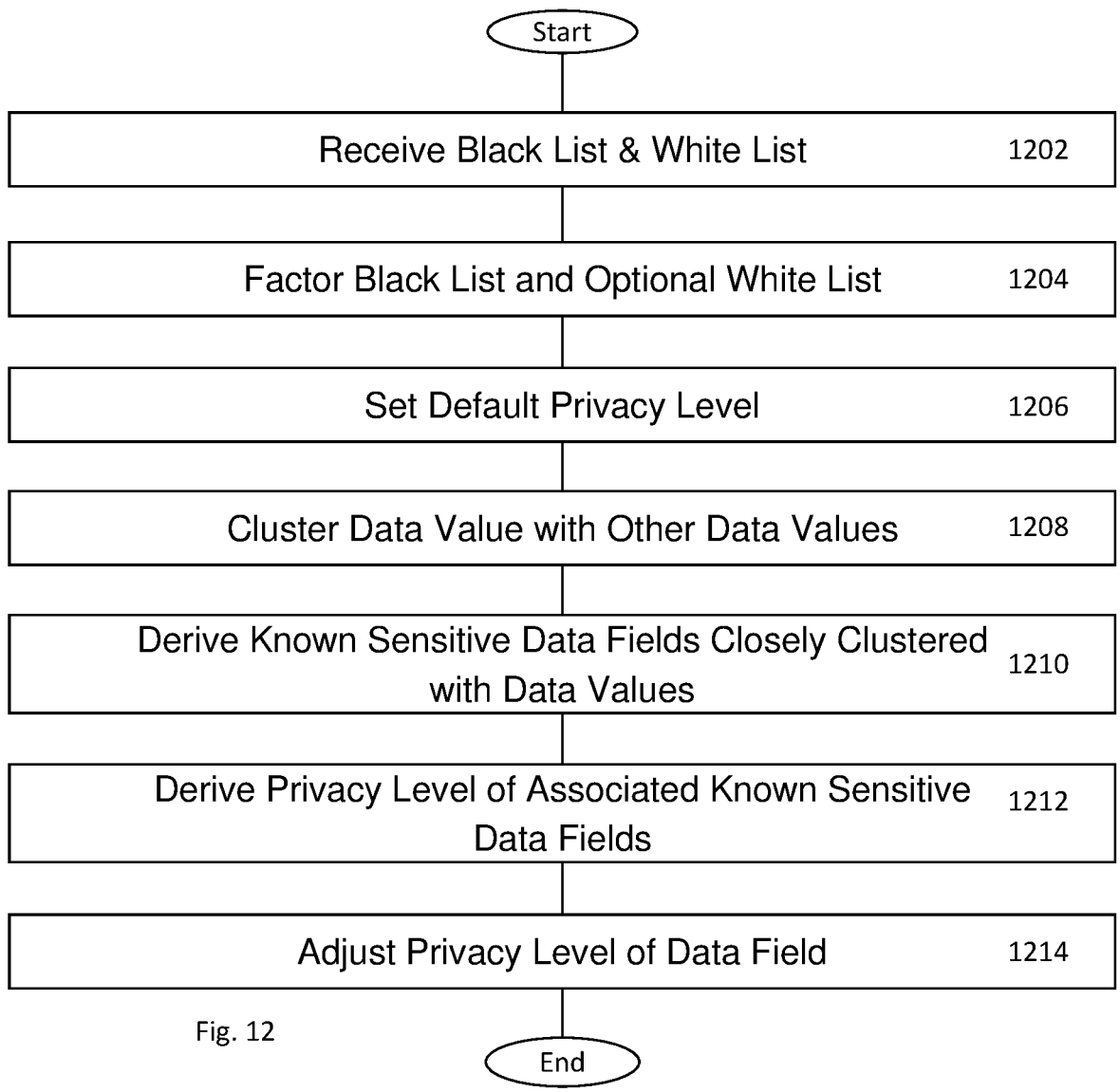
FIG. 12 illustrates a flowchart of an embodiment of a method for assigning a privacy level to a data field.

FIG. 12 illustrates a flowchart of an embodiment of a method for assigning a privacy level to a data field. The permission module may optionally receive a white list describing data fields to be left transparent to a system user of a specific authority level and a black list describing data fields to be anonymized before display from an external data source (Block 1202). The permission module is configured to factor at least one of i) the black list and ii) the optional whitelist into determining the privacy level (Block 1204). The clustering module can set a default privacy status for all data fields so that the default privacy level triggers anonymization of all data values that have data identifiable to the network entity. The default privacy level anonymizes all data fields until a distance from know personally identifiable data fields is achieved in the clustering (Block 1206). The clustering module applies one or more clustering techniques to the data values from the data fields within the input data in order to associate their corresponding data fields with an associated known sensitive data field based on proximity of their clustered data values. Thus, the association occurs by locating data values that reflect identifiable information to the network entity to be clustered in close proximity. (Block 1210). The clustering module is configured to adjust the privacy level of the data field up or down based on a privacy level assigned to the associated known sensitive data field when the data value of the first data field is closely clustered to a data value of that associated known sensitive data field (Block 1212).

Figure 13:
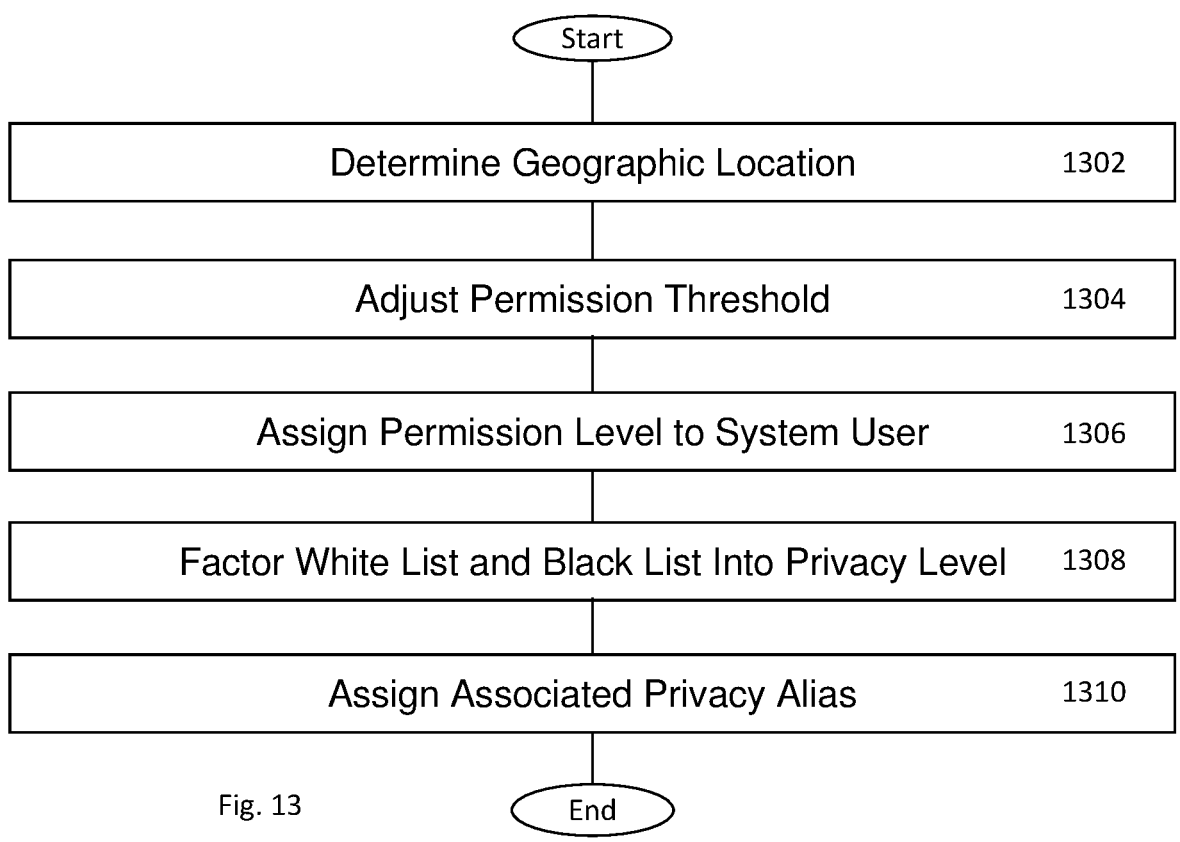
FIG. 13 illustrates a flowchart of an embodiment of a method for establishing a permission threshold.

FIG. 13 illustrates a flowchart of an embodiment of a method for establishing a permission threshold. The aliasing module can be configured to determine a geographic location for the system user (Block 1302). The aliasing module can then be configured to adjust the permission threshold based on the geographic location (Block 1304). The aliasing module is configured to assign a permission level to the system user to determine whether the system user is permitted to view the input data subject to at least one of i) data values identifiable to any network entity will have a substituted alias when the system user is assigned a full anonymization permission level and ii) data values identifiable to merely any user of the network will have a substituted alias when the system user is assigned a reduced anonymization permission level (1306). This permission level may be manually selected or overridden by a system administrator in the cyber threat defense system graphical user interface (Block 1308). A reduced anonymization permission level leaves some data values such as destination URLs visible to the system user. The aliasing module is configured to factor the black list and optional white list into determining the privacy level (Block 1308). The aliasing module can assign a linked privacy alias as the privacy alias for the data value in order to link the privacy alias to an associated privacy alias for another data field with a similar data value. Thus, the aliasing module assigns a linked privacy alias as the privacy alias for, for example, a first data value of a first data field in order to link this privacy alias to the privacy aliases of other data values in, for example, a second and third data field, which have similar data value strings (Block 1310).

Figure 14:
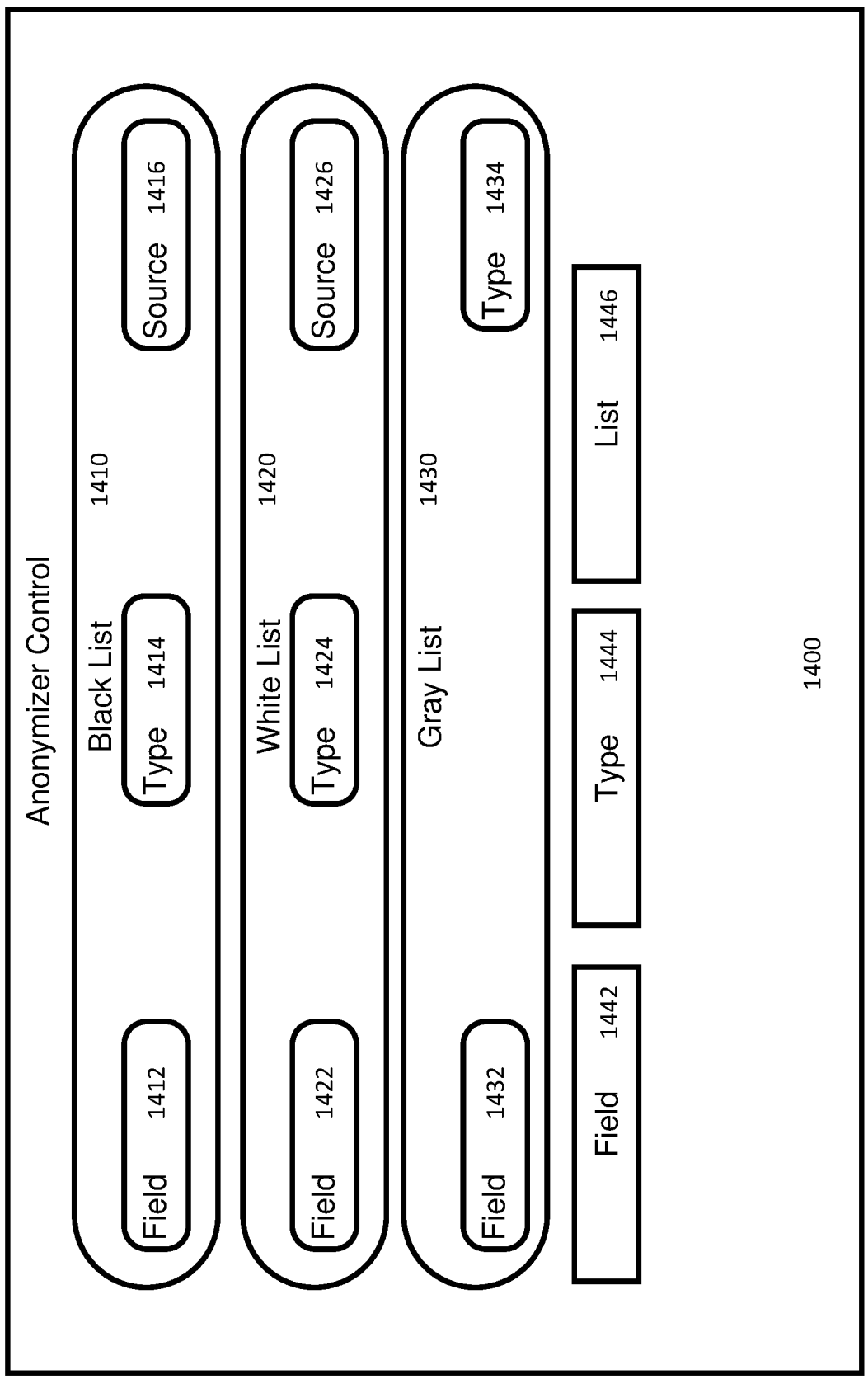
FIG. 14 illustrates a block diagram of an embodiment of a privacy protection control.

A system administrator may adjust the gray list to specify the data fields to be anonymized. FIG. 14 illustrates a block diagram of an embodiment of a privacy protection control 1400. The user interface module can generate the option for a system administrator to enable privacy protection control 1400 for specific users as a popup box from the threat-tracking graphical user interface. The privacy protection control 1400 can have a black list panel 1410 listing each data field 1412 to be anonymized. The black list panel 1410 can identify a data field type 1414 as provided by the list source and a listing source 1416 for each data field 1412. The data field type 1414 categorizes the data value the data field 1412 describes, such as a textual string, numeric string, etc. The listing source categorizes the input source from which the data field 1412 was derived, such as from a protocol or from connection information. The privacy protection control 1400 can have a white list panel 1420 listing each data field 1422 to be left public. The white list panel 1420 can identify a data field name 1424 as provided by the list source and a listing source 1426 for each data field type 1422. The privacy protection control 1400 can have a gray list panel 1430 listing each data field 1432 the aliasing module has inferred to be anonymized. The gray list panel 1430 can identify a data field type (such as textual string, numeric string, etc.) 1434 as determined by the clustering module.

The privacy protection control 1400 may have a data field name input 1442 for a user to enter a data field name to be placed on either the black list or the white list. If this data field is already present on the gray list 1430, the data field will be removed from the gray list. The privacy protection control 1400 may have a data field type input 1444 for the user to enter a data field type categorizing the type of information represented by the data field. The privacy protection control 1400 may have a list input 1446 for a user to select either the black list or the white list.

Figure 15:
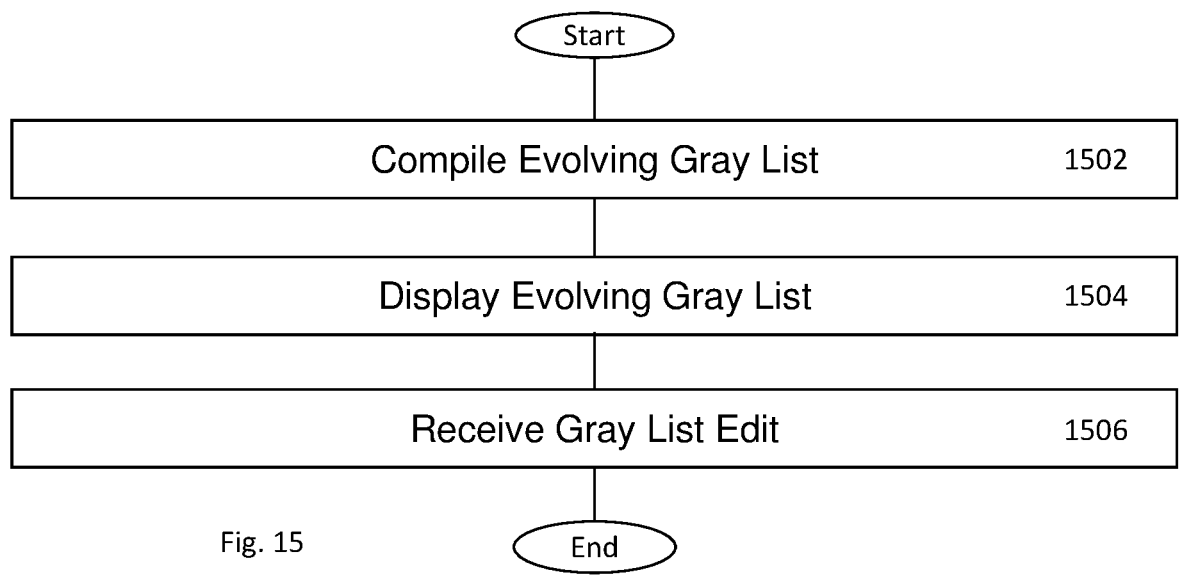
FIG. 15 illustrates a flowchart of an embodiment of a method for adjusting the gray list of the privacy protection component.

FIG. 15 illustrates a flowchart of an embodiment of a method for adjusting the gray list of the privacy protection component. The aliasing module is configured to compile an evolving gray list identifying data fields inferred to be subject to anonymization (Block 1502). The aliasing module can be configured to present the evolving gray list to a system administrator for review (Block 1504). The aliasing module is configured to receive a gray list edit from the system administrator altering the privacy level for the data fields on the gray list (Block 1506).

Web Site

The web site is configured as a browser-based tool or direct cooperating app tool for configuring, analyzing, and communicating with the cyber threat defense system.

Network

A number of electronic systems and devices can communicate with each other in a network environment. FIG. 16 illustrates in a simplified diagram a networked environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. A module's functionality can be combined into another module as well as can be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a privacy protection component in a cyber threat defense system to comply with a set of privacy requirements when displaying input data, comprising:
    identifying data fields with data values within input data as data identifiable to a network entity using one or more machine-learning models trained on known data fields and their data, where the network entity is at least one of a user and a device associated with a network being protected by the cyber threat defense system;
    clustering the data values with other data values having similar characteristics using at least one machine-learning model trained on known data fields with identified privacy levels used in the network to infer a privacy level associated with each data field, where a privacy level is utilized to indicate whether, at least, a first data value in a first data field should be public or anonymized;
    determining a privacy status of the first data field by comparing the privacy level to a permission threshold;
    applying an alias transform to the first data value in the first data field with a privacy alias to anonymize the first data value in the data field;
    presenting the privacy alias to a system user in place of the first data value;
    comparing the input data to at least one machine-learning model trained on a normal benign behavior of that network entity using a normal behavior benchmark describing parameters corresponding to a normal pattern of activity for that network entity to spot behavior on the network deviating from a normal benign behavior of that network entity;
    identifying whether the network entity is in a breach state of the normal behavior benchmark;
    identifying whether the breach state and a chain of relevant behavioral parameters deviating from the normal benign behavior of that network entity correspond to a cyber threat; and
    presenting the breach state and the chain of relevant behavioral parameters with one or more of the data values replaced by a privacy alias.

2. The method for the privacy protection component of claim 1, further comprising:
    setting a default privacy status for all data fields so that the default privacy status triggers anonymization for all data values that reflect identifiable information to the network entity.

3. The method for the privacy protection component of claim 1, further comprising:
    compiling an evolving gray list identifying data fields inferred to be subject to anonymization, and
    presenting the evolving gray list to a system administrator to alter a privacy level up or down for one or more of the data fields on the gray list.

4. The method for the privacy protection component of claim 1, further comprising:
    applying one or more clustering techniques to the data values from the data fields within the input data in order to associate their corresponding data fields with an associated known sensitive data field, where the association occurs by locating data values that reflect identifiable information to the network entity to be clustered in close proximity.

5. The method for the privacy protection component of claim 4, further comprising:
    adjusting the privacy level of the first data field up or down based on a privacy level assigned to the associated known sensitive data field when the data value of the first data field is closely clustered to a data value of that associated known sensitive data field.

6. The method for the privacy protection component of claim 1, further comprising:
    assigning a linked privacy alias as the privacy alias for the data value of the first data field in order to link the privacy alias to the privacy aliases of other data values with similar value strings.

7. The method for the privacy protection component of claim 1, further comprising:
    assigning a permission level to the system user to determine whether the system user is permitted to view the input data subject to at least one of i) data values identifiable to any network entity will have a substituted alias when the system user is assigned a full anonymization permission level and ii) data values identifiable to merely any user of the network will have a substituted alias when the system user is assigned a reduced anonymization permission level.

8. The method for the privacy protection component of claim 1, further comprising:
    exporting the input data mixed in with instances of one or more data values replaced with their privacy alias.

9. A non-transitory computer readable medium comprising computer readable code operable, when executed by one or more processing apparatuses in the cyber threat defense system to instruct a computing device to perform the method of claim 1.

10. An apparatus for a cyber threat defense system configured to comply with privacy requirements, comprising:
    at least one processor;
    and a memory, comprising a plurality of modules, executable by the at least one processor;
    the apparatus further comprising:
    an ingestion module configured to collect input data describing network activity executed by a network entity, where the network entity is at least one of a user and a device associated with a network;
    a clustering module configured to identify data fields with data values within the input data from the ingestion module as data identifiable to the network entity using one or more machine-learning models trained on known data fields and their data, where the clustering module is also configured to cluster the data values with other data values having similar characteristics using at least one machine-learning model trained on known data fields with identified privacy levels used in the network to infer a privacy level associated with that data field, where a privacy level is utilized to indicate whether, at least, a first data value in a first data field should be anonymized;
    a permission module configured to determine a privacy status of, at least, the first data field by comparing the privacy level to a permission threshold;
    an aliasing module configured to apply an alias transform, at least, to the first data value in the first data field with a privacy alias to anonymize the first data value in the first data field based on the privacy status i) assigned by the permission module ii) manually entered by a system administrator in a graphical user interface, and iii) any combination of both;

a user interface module configured to present to a system user the input data with the privacy alias from the aliasing module substituted for, at least, the first data value of the first data field;

a comparison module configured to execute a comparison of the input data to at least one machine-learning model trained on a normal benign behavior of that network entity using a normal behavior benchmark describing parameters corresponding to a normal pattern of activity for that network entity to spot behavior on the network deviating from a normal benign behavior of that network entity, and identify whether the network entity is in a breach state of the normal behavior benchmark:

a cyber threat module configured to identify whether the breach state and a chain of relevant behavioral parameters deviating from the normal benign behavior of that network entity correspond to a cyber threat; and where the user module is configured to present the breach state and the chain of relevant behavioral parameters with one or more of the data values replaced by a privacy alias.

11. The apparatus for the cyber threat defense system of claim 10, wherein the permission module is configured to compile an evolving gray list identifying data fields inferred to be subject to anonymization.

12. The apparatus for the cyber threat defense system of claim 11, wherein the user interface module is configured to present the evolving gray list to a system administrator for review.

13. The apparatus for the cyber threat defense system of claim 12, wherein the user interface module is configured to receive a gray list edit from the system administrator altering the privacy level up or down for one or more of the data fields on the gray list.

14. The apparatus for the cyber threat defense system of claim 10, wherein the permission module is configured to factor at least one of, i) a black list describing data fields to be anonymized before display into determining the privacy level, and ii) a white list describing data fields to be left transparent to a system user into determining the privacy level.

15. The apparatus for the cyber threat defense system of claim 10, wherein the aliasing module is configured to assign a privacy alias on a per session-basis so that a fresh privacy alias is generated for the data values for each session.

16. The apparatus for the cyber threat defense system of claim 10, wherein the permission module is configured to determine a geographic location for the system user and to adjust the permission threshold based on the geographic location.

17. The apparatus for the cyber threat defense system of claim 10, wherein the clustering module is configured to set a default privacy status for all data fields so that the default privacy level triggers anonymization of all data values that have data identifiable to the network entity.

18. The apparatus for the cyber threat defense system of claim 10, wherein the permission module is configurable to assign a permission level to the system user to determine whether the system user is permitted to view the input data, subject to at least one of i) data values identifiable to any network entity will have a substituted alias when the system user is assigned a full anonymization permission level and ii) data values identifiable to merely any user of the network will have a substituted alias when the system user is assigned a reduced anonymization permission level.

19. A network, comprising:

at least one firewall;

at least one network switch;

multiple computing devices operable by users of the network;

a cyber-threat coordinator-component that includes an ingestion module configured to collect input data describing network activity executed by a network entity, where the collected input data is received from i) a set of probes deployed to a network entity, ii) by passive traffic ingestion through a location within the network, and iii) any combination of both, where the network entity is at least one of a user and a device associated with a network, a comparison module configured to execute a comparison of the input data to at least one machine-learning model trained on a normal benign behavior of the network entity using a normal behavior benchmark describing parameters corresponding to a normal pattern of activity for that network entity to spot behavior on the network deviating from the normal benign behavior of that network entity in order to identify whether the network entity is in a breach state of the normal behavior benchmark, and a cyber threat module configured to identify whether the breach state identified by the comparison module and a chain of relevant behavioral parameters deviating from the normal benign behavior of that network entity correspond to a cyber threat; and a privacy protection component that includes a clustering module configured to identify data fields with data values within the input data from the ingestion module as data identifiable to the network entity using one or more machine-learning models trained on known data fields and their data, where the clustering module is also configured to cluster the data values with other data values having similar characteristics using at least one machine-learning model trained on known data fields with identified privacy levels used in the network to infer a privacy level associated with that data field, where a privacy level is utilized to indicate whether, at least, a first data value in a first data field should be anonymized, a permission module configured to determine a privacy status of, at least, the first data field by comparing the privacy level to a permission threshold, an aliasing module configured to apply an alias transform, at least, to the first data value in the first data field with a privacy alias to anonymize the first data value in the first data field based on the privacy status i) assigned by the permission module, ii) manually entered by a system administrator in the graphical user interface, and iii) any combination of both, and a user interface module configured to present a cyber threat-tracking graphical user interface to display the input data with the privacy alias from the aliasing module substituted for at least the data value of the first field to a system user; and wherein the cyber-threat coordinator-component reduces overhead by automatically maintaining compliance with privacy requirements across environments and minimizing an amount of CPU cycles, memory space, and power consumed in maintaining that compliance.

* * * * *